United States Patent
Hall et al.

(10) Patent No.: US 12,409,351 B2
(45) Date of Patent: Sep. 9, 2025

(54) HEAD COVERING DEVICE PROVIDING FILTERED AIR

(71) Applicant: Hall Labs LLC

(72) Inventors: Michael Hall, Provo, UT (US); David R. Hall, Provo, UT (US); Jacob Dean, Provo, UT (US); Miguel Lazaro, Provo, UT (US); Vicente Oliveira, Provo, UT (US); Prabhakar Ramaraj, Provo, UT (US); Lucas Conde, Provo, UT (US); Kevin Englund, Provo, UT (US); Carson Richards, Provo, UT (US)

(73) Assignee: MicroClimate, Inc., Provo, UT (US)

( * ) Notice: Subject to any disclaimer, the term of this patent is extended or adjusted under 35 U.S.C. 154(b) by 599 days.

(21) Appl. No.: 17/815,212

(22) Filed: Jul. 26, 2022

(65) Prior Publication Data
US 2023/0024861 A1 Jan. 26, 2023

Related U.S. Application Data

(60) Provisional application No. 63/225,864, filed on Jul. 26, 2021.

(51) Int. Cl.
*A62B 18/04* (2006.01)
*A42B 3/28* (2006.01)
(Continued)

(52) U.S. Cl.
CPC .......... *A62B 18/045* (2013.01); *A42B 3/281* (2013.01); *A42B 3/286* (2013.01); *A62B 18/084* (2013.01); *A62B 23/02* (2013.01)

(58) Field of Classification Search
CPC ........ A42B 3/225; A62B 18/04; A62B 18/045
See application file for complete search history.

(56) References Cited

U.S. PATENT DOCUMENTS 2,418,473 A * 4/1947 Lambertsen ...... A61M 16/0627
128/205.26
5,054,480 A * 10/1991 Bare .................... A62B 18/045
128/206.28

(Continued)

*Primary Examiner* — Bradley H Philips

(57) ABSTRACT

A device for filtering air for a user comprising a frame formed in a generally oval-shaped band, the band encircling the user's head, with an upper portion above the user's head and a lower portion proximate to and spaced apart from the user's chin, an intake aperture formed in the frame, and an intake air filter covering the intake aperture. The device includes an air mover chamber attached with an air-tight seal to an inside surface of the frame and communicating on one end with the intake air filter and communicating on another end with a filtered air supply inlet inside the device and an air mover disposed within the air mover chamber and configured to draw air through the intake air filter and push air out the filtered air supply inlet. The device also includes an exhaust aperture formed in the frame and an exhaust air filter covering the exhaust aperture. The device further includes a transparent face shield attached with an air-tight seal to a front surface of the frame, the shield providing a space for air between an inside surface of the face shield and the user's face, and a fabric component comprising a first portion that is air permeable configured to cover the frame and filters and a second portion that is air impermeable extending from a back surface of the frame to cover a remaining portion of the user's head and encircle the user's neck.

22 Claims, 20 Drawing Sheets

(51) Int. Cl.
*A62B 18/08* (2006.01)
*A62B 23/02* (2006.01)

(56) References Cited

U.S. PATENT DOCUMENTS

| | | | |
|---|---|---|---|
| 11,065,479 B1* | 7/2021 | Rafalovich | A62B 17/04 |
| 11,134,739 B1* | 10/2021 | Jin | H04M 1/19 |
| 2015/0082522 A1* | 3/2015 | Rosati | A41D 13/0025 |
| | | | 2/424 |
| 2016/0030779 A1* | 2/2016 | Twu | A62B 18/02 |
| | | | 128/202.13 |
| 2018/0132550 A1* | 5/2018 | Czajka | A62B 18/045 |
| 2020/0215360 A1* | 7/2020 | Delprat | A62B 17/04 |

* cited by examiner

US 12,409,351 B2

HEAD COVERING DEVICE PROVIDING FILTERED AIR

CROSS-REFERENCE TO RELATED APPLICATION

This application is a continuation-in-part to U.S. Provisional Patent Application No. 63/225,864, filed Jul. 26, 2021, the entire disclosure of which is incorporated herein by reference.

TECHNICAL FIELD

The present disclosure relates to head covering devices. More particularly, it relates to a head covering device to provide filtered air to a user.

BACKGROUND

Head covering devices (HCDs) on the market, such as helmets, are typically designed for some type of injury prevention. For example, personal protection equipment (PPE) for the head is commonly construction helmets or welder's helmets. Recreational protective head gear includes motorcycle helmets and sports helmets such as helmets for skiers, bikers, mountain climbers, baseball, and football players. Other types of HCDs include protection equipment such as splash shields and filters for firefighters, policemen, HAZMAT specialists, health care workers, and other first responders. In many cases, the HCDs are heavy, bulky and can be uncomfortable and may not provide sufficient protection.

Lighter fans and batteries have made all-in-one powered air purifying respirators (PAPRs) possible. All-in-one PAPRs are much easier to handle and wear compared to traditional belt mounted or backpack mounted PAPRs. Although these all-in-one PAPR designs are an improvement, they can still struggle with user comfort. For example, if the PAPR is not balanced front to back, a strain is placed on the user's neck muscles when using the PAPR. Also, the center of gravity of many all-in-one PAPRs is typically high and off center. This can likewise cause discomfort and strain, particularly in the neck muscles, as the user moves his head.

SUMMARY

One aspect of the present invention is a device for filtering air for a user comprising a frame formed in a generally oval-shaped band, the band encircling the user's head, with an upper portion above the user's head and a lower portion proximate to and spaced apart from the user's chin, an intake aperture formed in the frame, and an intake air filter covering the intake aperture. The device includes an air mover chamber attached with an air-tight seal to an inside surface of the frame and communicating on one end with the intake air filter and communicating on another end with a filtered air supply inlet inside the device and an air mover disposed within the air mover chamber and configured to draw air through the intake air filter and push air out the filtered air supply inlet. The device also includes an exhaust aperture formed in the frame and an exhaust air filter covering the exhaust aperture. The device further includes a transparent face shield attached with an air-tight seal to a front surface of the frame, the shield providing a space for air between an inside surface of the face shield and the user's face, and a fabric component comprising a first portion that is air permeable configured to cover the frame and filters and a second portion that is air impermeable extending from a back surface of the frame to cover a remaining portion of the user's head and encircle the user's neck.

In another aspect of the invention, the device further comprises a second intake aperture formed in the frame, a second intake air filter covering the second intake aperture, a second air mover chamber, and a second air mover wherein the intake aperture and the second intake aperture a formed in the band symmetrically on opposite sides between the top portion and bottom portion.

In a still further aspect, the device further comprised a second exhaust aperture and a second exhaust air filter, wherein the exhaust aperture and the second exhaust aperture are formed in the frame symmetrically on opposite sides of the lower portion.

In a yet still further aspect, the device further comprised a power control box attached inside the top portion of the frame and a rechargeable battery within the power control box for powering the air mover and the second air mover.

In another aspect, the transparent face shield is constructed from materials that are approved for impact resistance by the American National Standards Institute (ANSI).

In another aspect of the invention, the air mover moves air so that there is a positive flow of air in the device and the air mover can be reversed so there is a negative flow of air in the device.

In still another aspect, the device further comprised a power control box attached inside the frame and a rechargeable battery within the power control box for powering the air mover.

In a still further aspect, the air mover chamber is attached to the frame by a gasket of resilient material. The air mover chamber may be integrally formed with the frame.

In a still yet further aspect, the air mover is a fan and the fan can be operated at different speeds, as selected by the user.

In another still yet further aspect, the fan is suspended by resilient members to isolate vibration of the fan during operation.

In another aspect of the invention, the fan comprises an outlet and further comprising a duct for directing air from the fan to the filtered air inlet. The duct can be formed from a resilient material to isolate vibration of the fan during operation.

In still another aspect, the transparent face shield is releasably attached to the front surface of the frame by releasable clamps.

In a still further aspect, the air-tight seal between the transparent face shield and the front surface of the frame is provided by a resilient gasket.

In a yet still further aspect, the intake air filter is formed with a resilient gasket around a perimeter, and wherein the resilient gasket comprises a circumferential groove, and wherein the intake air filter is held in place as the groove captures an edge of the frame around the intake aperture.

In another still yet further aspect, the exhaust air filter is formed with a resilient gasket around a perimeter, and wherein the resilient gasket comprises a circumferential groove, and wherein the exhaust air filter is held in place as the groove captures an edge of the frame around the exhaust aperture.

In another aspect of the invention, the device further comprised a switch mounted to the frame, wherein the switch is covered by the first portion of the fabric component, but operable therethrough. The switch can be a button, configured to activate different modes of operation depending on the number of times the button is pushed by the user. The different modes of operation include different speeds for the air mover.

In an aspect of the invention, a device for filtering air for a user comprising a frame formed in a generally oval-shaped band, the band encircling the user's head, with an upper portion above the user's head and a lower portion proximate to and spaced apart from the user's chin. The device includes a first intake aperture formed in the frame and a first intake air filter covering the first intake aperture and a second intake aperture formed in the frame and a second intake air filter cover the second intake aperture. The device also includes a first air mover chamber attached with an air-tight seal to an inside surface of the frame and communicating on one end with the first intake air filter and communicating on another end with a first filtered air supply inlet inside the device and a second air mover chamber attached with an air-tight seal to an inside surface of the frame and communicating on one end with the second intake air filter and communicating on another end with a second filtered air supply inlet inside the device. The device further includes a first air mover disposed within the first air mover chamber and configured to draw air through the first intake air filter and push air out the first filtered air supply inlet and a second air mover disposed within the second air mover chamber and configured to draw air through the second intake air filter and push air out the second filtered air supply inlet. The device still further includes a first exhaust aperture formed in the frame and a first exhaust air filter covering the first exhaust aperture and a second exhaust aperture formed in the frame and a second exhaust air filter covering the second exhaust aperture. The device yet still further includes a transparent face shield attached with an air-tight seal to a front surface of the frame, the shield providing a space for air between an inside surface of the face shield and the user's face, and a fabric component comprising a first portion that is air permeable configured to cover the frame and filters and a second portion that is air impermeable extending from a back surface of the frame to cover a remaining portion of the user's head and encircle the user's neck.

Further aspects and embodiments are provided in the following drawings, detailed description, and claims. Unless specified otherwise, the features as described herein are combinable and all such combinations are within the scope of this disclosure.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Overview

Figure 1:
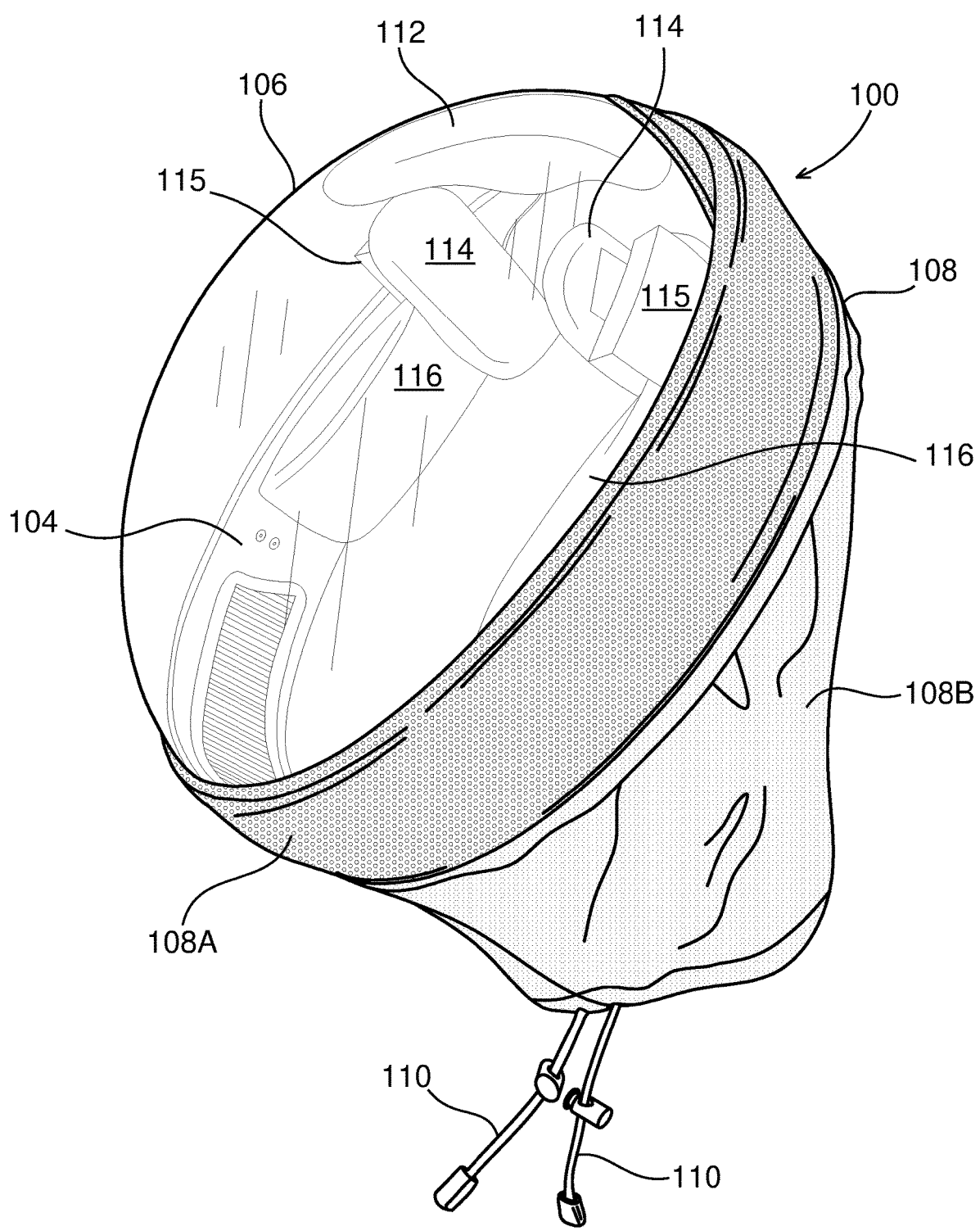
FIG. 1 is a perspective view of an embodiment of a dual fan variable flow head covering device (DFVFHCD), according to an embodiment of the disclosure.

Embodiments of methods, materials and processes described herein are directed towards head covering devices. Head covering devices, also referred to as personal protection headwear, can be used to provide a filtered air environment to a user to prevent a user from being infected with a contagious disease. Head covering devices may also filter the exhaust air to prevent a user from spreading a contagious disease.

Head covering devices disclosed herein include a rigid portion and a flexible portion combined to completely cover the head of a user. The rigid portion includes a frame and a transparent face shield. The flexible portion includes a fabric that seals around the neck of a user. The disclosure herein describes various designs and components including air movers and air filters to filter the air entering the device and the air being exhausted from the device.

One advantage of the preferred embodiment is that it provides the protection of filtered air for the user while leaving the user's face visible to others. In this way, non-verbal communication, such as by facial expressions, is not blocked. The device also does not interfere with facial recognition devices.

Another advantage of the preferred embodiment is that it holds a relatively large volume of air around the user's head. This is contrasted with conventional masked or other breathing apparatuses that just seal the volume around the mouth and nose. The present design seals all the way around the user's head. As such, there is a larger volume of air that can act as a buffer, thus reducing any chance for leaks due to sudden increases in exhalation from coughs or sneezes or due to sudden increases in inhalations from gasps. The greater volume also means that the air movers, such as electric powered fans, can work with a lower pressure differential, while maintaining user comfort.

Preferably, the device comprises dual fans where a fan is located on either side of the frame and connected to the frame by a resilient material to limit noise and vibrations heard and felt by the user. Rechargeable batteries used to power the fans are located at the upper portion of the frame and behind the head of the user.

Definitions

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, the term "user" refers to any individual who uses an HCD.

As used herein, the term "filter," as a noun, refers to a device, typically composed of fibrous or porous materials which removes unwanted components, usually in the form of particulates, such as dust, pollen, mold, viruses, and bacteria, from air. Filters containing an adsorbent or catalyst, such as charcoal (carbon), may also remove odors and gaseous pollutants such as volatile organic compounds or ozone. Air filters are generally used in applications where air quality is important. As a verb, "filter" refers to the act of removing particles from air.

As used herein, the term "transparent" is used in its normal sense, that is the property of allowing light to pass through so that behind can be distinctly seen therethrough. The transparent components described and defined below are preferably clear, but may be tinted, in whole or in part.

The term "positive air flow" is used to indicate that, in accordance with embodiments of the invention, air is actively pulled inside the HCD by an air mover through an intake filter in the air mover and exhausted through an exhaust filter.

The term "negative air flow" is used to indicate that, in accordance with embodiments of the invention, air is actively pulled inside the HCD through an intake filter by an air mover and the air is exhausted out an exhaust filter.

The term "neutral air flow" is used to indicate that, in accordance with embodiments of the invention, a substantially static flow of air is maintained in the HCD. The air flow into and out of the HCD is controlled by the breathing in and breathing out of the user.

As used herein, the term "powered air purifying respirator" or "PAPR" refers to a type of respirator used to safeguard workers against contaminated air. PAPRs consists of a headgear and fan assembly that takes ambient air contaminated with one or more type of pollutant or pathogen, actively removes or filters a sufficient proportion of these hazards, and then delivers the clean air to the user's face, mouth, or nose.

As used herein, the term "center of gravity" refers to the unique point where the weighted relative position of the distributed mass sums to zero.

As used herein, the term "thermoelectric cooler" refers to cooling devices that operate on the principle of the Peltier effect. A thermoelectric cooler may also be used for temperature control for both heating and cooling depending upon how it is arranged in a device.

As used herein, the term "Peltier effect" refers to the effect that creates a temperature difference by transferring heat between two electrical junctions. A voltage is applied across joined conductors to create an electric current. When the current flows through the junctions of the two conductors, heat is removed at one junction and cooling occurs. Heat is deposited at the other junction. The main application of the Peltier effect is cooling, though the Peltier effect can also be used for heating or control of temperature.

As used herein, the terms "energy recovery device" and "heat recovery device" refers to a device that operates on the basis of air-to-air exchange theory where two air-streams in contact and passing in opposite directions, transfers heat/energy between the two air-streams. As used herein, the term "phase-change material" or "PCM" refers to materials that use the heat of crystallization, melting or some other phase change to thereby either store heat in a predetermined temperature range or release heat in a predetermined lower temperature range.

As used herein, the term "polarizer" is an optical filter that lets light waves of a specific polarization pass through while blocking light waves of other polarizations. A polarizer can filter a beam of light of undefined or mixed polarization into a beam of well-defined polarization, that is polarized light.

As used herein, the term "photochromic" refers to a device or system where the optical properties change on exposure to light having a predetermined property, most commonly ultraviolet (UV) radiation. Most commonly, an optical lens changes from an optically transparent state to a darkened state upon exposure to UV radiation. When the UV radiation is removed, the lens returns to a clear state.

As used herein, the term "electrochromic" is where optical properties such as optical transmission, absorption, reflectance and/or emittance can be controlled in a reversible manner upon, application of an electrical energy, such as a voltage bias.

As used herein, the term "optical head-mounted display" (OHMD) refers to a wearable device that has the capability of reflecting projected images as well as allowing the user to see through the display, similar to augmented reality technology.

As used herein, the term "augmented reality" (AR) refers an interactive experience of a real-world environment where the objects that reside in the real world are enhanced by computer-generated perceptual information, sometimes across multiple sensory modalities, including visual, auditory, haptic, somatosensory and olfactory. AR can be defined as a system that fulfills three basic features: a combination of real and virtual worlds, real-time interaction, and accurate 3D registration of virtual and real objects.

As used herein, the term "hook-and-loop fastener" which is commonly referred to as "Velcro" refers to two components: typically, two lineal fabric strips (or, alternatively, round "dots" or squares) which are attached (sewn or otherwise adhered) to the opposing surfaces to be fastened. The first component features tiny hooks, the second features smaller loops. When the two are pressed together the hooks catch in the loops and the two pieces fasten or bind temporarily. When separated, by pulling or peeling the two surfaces apart, the strips make a distinctive "ripping" sound.

As used herein, the term "proximity sensor" refers to a sensor that is able to detect the presence of nearby objects without any physical contact. A proximity sensor often emits an electromagnetic field or a beam of electromagnetic radiation (infrared, for instance), and looks for changes in the field or return signal. The object being sensed is often referred to as the proximity sensor's target. Different proximity sensor targets demand different sensors. For example, a capacitive proximity sensor or photoelectric sensor might be suitable for a plastic target; an inductive proximity sensor always requires a metal target. Other types of proximity sensors include capacitive displacement sensor, Doppler effect sensor, magnetic sensor, reflective sensor, photoelectric sensor, laser rangefinder sensor, thermal infrared sensor, radar sensor, ionizing radiation sensor, ultrasonic sensor, fiber optics sensor, or a Hall effect sensor.

As used herein, the term "QR (quick response) code" refers to a type of matrix barcode (or two-dimensional barcode) first designed in 1994 for the automotive industry in Japan. A barcode is a machine-readable optical label that contains information about the item to which it is attached. In practice, QR codes often contain data for a locator, identifier, or tracker that points to a website or application. A QR code uses four standardized encoding modes (numeric, alphanumeric, byte/binary, and kanji) to store data efficiently; extensions may also be used. A QR code consists of black squares arranged in a square grid on a white background, which can be read by an imaging device such as a camera and processed using Reed-Solomon error correction until the image can be appropriately interpreted. The required data is then extracted from patterns that are present in both horizontal and vertical components of the image.

As used herein, the term "occupational noise" refers to the amount of acoustic energy received by an employee's auditory system when they are working in the industry. Occupational noise, or industrial noise, is often a term used in occupational safety and health, as sustained exposure can cause permanent hearing damage. Occupational noise is considered an occupational hazard traditionally linked to loud industries such as ship-building, mining, railroad work, welding, and construction, but can be present in any workplace where hazardous noise is present.

As used herein, the term "noise cancelling" refers to earpieces or headphones that utilize active noise control (ANC), which is also known as noise cancellation (NC), to reduce unwanted noises and sound by the addition of a second sound specifically designed to cancel the first.

As used herein, the term "night vision device" which is also known as "night vision goggles", refers to an optoelectronic device that allows images to be produced in levels of light approaching total darkness. The image may be a conversion to visible light of both visible light and near-infrared, while by convention detection of thermal infrared is denoted thermal imaging.

The "user's ear" is used as a reference point herein. For clarification, this reference point is intended to refer to the point over the ear canal of the user.

Exemplary Embodiments

The present disclosure relates to HCDs to provide a controlled and comfortable environment to a user. Users may need a controlled environment due to various health-related reasons such as to protect those with respiratory ailments, compromised immune systems, and advanced age from airborne contagion. The same protection may also be needed for the protection of health care providers. Alternatively, such devices may be desirable to use in harsh environments, such as extreme cold or heat, or environments with high levels of suspended particulate, such as dust. Still further, such devices may also be desirable to protect the user from harsh noise environments. The present disclosure illustrates embodiments of HCDs that include at least one air mover.

In various exemplary embodiments, the HCD includes a rigid component and fabric component that when combined, completely cover the head of a user and seals around the neck of the user. In various exemplary embodiments, the fabric component comprises a portion that is permeable to air and a portion that is impermeable to air. In other embodiments, the fabric component is only impermeable to air. One or more air movers can pull air from inside the HCD and exhaust it to the environment, push air from outside the HCD to inside the HCD and exhaust it to the environment or maintain a neutral air flow as desired by a user. The air that passes through an inlet aperture to enter the HCD is filtered and an outlet aperture to exhaust air is also filtered.

In various exemplary embodiments, the flow of the air in the HCD can be controlled at different speeds to form a variable flow HCD (VFHCD). Outside air is pushed into the VFHCD by passing through a permeable fabric component and a filter, or just a filter, into an air mover located in an air mover chamber wherein the air is then directed through a duct into the VFHCD. The VFHCD may comprise one or two air movers.

In various exemplary embodiments, the VFHCD further comprises environmental and climate control components to monitor and control the air inside the VFHCD and to dim the face shield. The VFHCD may further comprise communication components to communicate with other users. The VFHCD disclosed herein may further include vibration isolating air movers to reduce noise inside the VFHCD.

Dual Fan Variable Flow Head Covering Device (DFVFHCD)

The following embodiments relate to a dual fan variable flow head covering device (DFVFHCD) capable of negative, positive, or neutral air flow to provide a comfortable and controlled environment for a user. While the following description and drawings depict a dual fan embodiment of a variable flow head covering device, it should be noted that the device may have one fan or more than two fans.

FIG. 1 is a perspective view of an embodiment of a dual fan variable flow head covering device (DFVFHCD) 100, according to an embodiment of the disclosure. The DFVFHCD is similar to the SFVFHCD disclosed previously herein. The DFVFHCD comprises an oval-shaped rigid frame 104 and a rigid transparent face shield 106.

FIG. 1 also illustrates a view of the fabric component 108 and drawstring 110. The fabric component comprises a portion 108A that is permeable or porous to air and a portion 108B that is impermeable to air. The impermeable portion may be substantially air-tight and does not cover the frame. The air permeable portion is stretched around the frame, covers the air filters, and allows air to pass through. The fabric component can be releasably attached by stretching around the frame. The fabric component may comprise an elastic band to facilitate stretching around the frame. The air impermeable portion 108B encircles and seals around the neck of a user. The air impermeable portion may be baggy and stretchable to allow a user to stretch the fabric with their hand to dab or scratch their face without breaking the seal around the use's neck. The air permeable and air impermeable portions may comprise materials of the same composition or different compositions. The air permeable and air impermeable portions may be joined by a seam. The fabric component may be removable and washable.

The fabric component 108 may comprise two or more layers. For example, the air impermeable or permeable portion may comprise an inner softer second sheet of fabric located between the air impermeable portion and the skin of the user. The inner sheet may be soft, washable, and absorbent.

The DFVFHCD 100 rests on top of the head of a user. A resting pad 112 is placed at the top of the face shield 106 that provides support and cushion between the device and the head of the user. The resting pad may comprise a cushion-like material such as cloth, foam, rubber, or other soft material and may be replaceable and washable. Multiple materials, sizes and/or shapes of removable resting pads may be available, so that the user can select the most comfortable one for their size and shape of head.

Also shown in the DFVFHCD in FIG. 1 are earpieces 114 to reduce noise, and dampen sound, and reverberations inside of the device as previously described herein. In a preferred embodiment, the earpieces are placed in front of the ears. As with the resting pad, multiple materials, sizes and/or shapes may be available and adaptable to provide comfort to the user depending on the shape and size of their head. The earpieces are attached to a mount 115 that is further attached to the face shield. The earpieces can be reversibly removed and reattached to the mounts such as when they may need to be washed or replaced. The earpieces may be attached by hook-and-loop fasteners, an adhesive, snaps, or other mechanism.

Also shown in the DFVFHCD in FIG. 1 are a first and second air mover chambers 116. The chambers are located on opposing sides of the frame. Air mover chambers 116 are attached to the inside of the band-like frame and form an airtight seal. A gasket of a resilient material may be disposed between the frame and air mover chamber. The chambers comprise a rigid housing composed of plastic. In some embodiments, the chamber may comprise a soft or flexible material such as rubber or foam. In some embodiments, one or more air mover chambers may be formed integrally with the frame. The one or more air mover chambers may be of unitary construction with the frame. Each chamber contains a single air mover that is arranged to push air into the DFVFHCD. In other embodiments, the air mover may be arranged to pull air out of the DFVFHCD. The chambers are secured and attached to the frame at multiple locations 148 by a connecting device. The connecting device may be screws, buttons, rivets, or other device.

Figure 2:
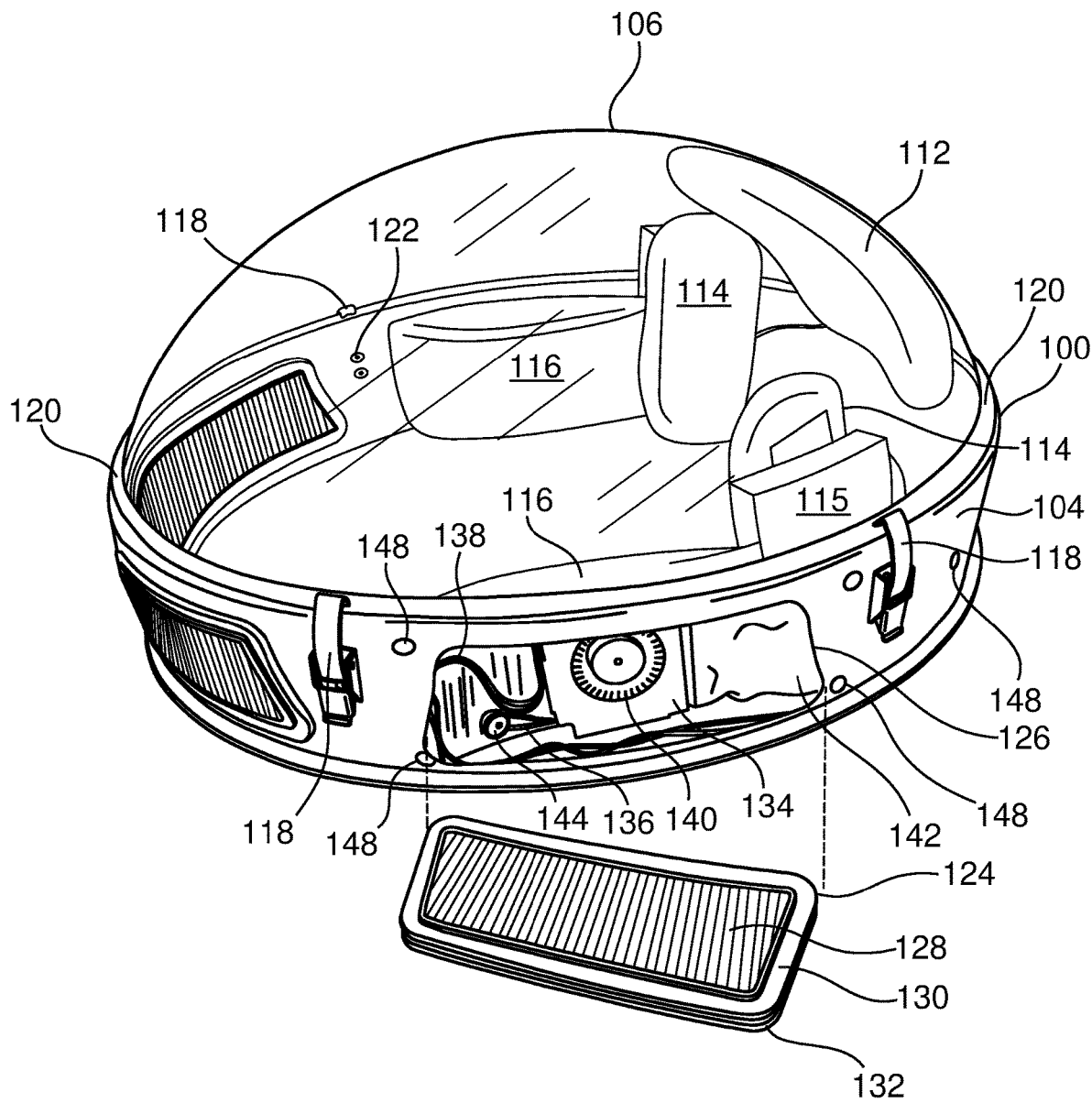
FIG. 2 is a perspective view of the dual fan variable flow head covering device (DFVFHCD) without the fabric and a filter showing the filters, face shield clamps, and air mover assembly, according to an embodiment of the disclosure.

FIG. 2 is a perspective view of the dual fan variable flow head covering device (DFVFHCD) without the fabric and a filter showing the filters, face shield clamps, and air mover assembly, according to an embodiment of the disclosure. In this view, it is further illustrated how the face shield is secured to the frame with releasable clamps 118. Four clamps are used to secure the face shield though one is hidden from view. More clamps may be used. The clamps provide pressure to the lip-like structure 120 that extends from the edge of the face shield to the top of the frame to form an airtight seal. Each clamp is attached to the frame with screws 122 but other means may be used. The transparent face shield can be releasably attached to the front surface of the frame by the releasable clamps. A gasket of resilient material may be disposed between the transparent face shield and top edge of the frame.

FIG. 2 further illustrates air filter assemblies 124 and how they are arranged over inlet and exhaust apertures within the frame of the device. The air filter assemblies are attached to apertures 126 within the frame. There is one inlet aperture on one side of the frame and a second inlet aperture symmetrically opposed to the first aperture on the other side of the frame. In other embodiments, the filter assembly may be located on the outside of the frame. The filter assembly further comprises a filter 128. The filter assembly comprises a resilient gasket-like material 130 affixed in a circumferential manner to a rigid support. The rigid support may comprise a polymer such as polystyrene (PS), high or low density polyethylene, polypropylene (PP), polyacrylonitrile, acrylonitrile butadiene styrene (ABS), polyvinyl chloride (PVC), polycarbonate (PC), polyethylene terephthalate (PET), polytetrafluoroethylene (PET), polymethylmethacrylate (PMMA), polyetheretherketone (PEEK), polyamide, polyimide, or a combination thereof. The support may comprise a metal such as aluminum.

The assembly comprises a groove or channel 132. The edge of the opening 126 in the frame sets in the groove to secure the filter assembly to the frame by capturing an edge of the frame to hold the filter in place. The gasket 130 forms an airtight seal between the filter assembly and the frame. The gasket is preferably a soft and flexible material that can form a seal between the filter assembly and the surface of the frame. The gasket may comprise a foam rubber-like material.

The filter assembly may also be connected to the frame by hook-and-loop fasteners, clips, snaps, channels, or other mechanism. In a preferred embodiment, the filter assembly can be reversibly removed or attached to the frame. The DFVFHCD comprises three more filter assemblies. The filter is to filter incoming air or outgoing air from inside the device. The filters located over the air inlet and outlet ports are pleated. In other embodiments, the filters may not be pleated.

The DFVFHCD further comprises an air mover 134 mounted to each of the two air mover chambers 116 that are further mounted to the frame. The air mover may be a fan or other air moving device as described herein. In this embodiment, an air mover is located on each side of the head of the user. In other embodiments, the air mover may be located at any other location on the frame and within the device. The frame may comprise one or more air moving devices. The air mover is powered by one or more batteries in a battery pack that is also mounted to the rear of the frame. The battery pack may be mounted at any location on the frame, such as the upper, side, or lower portion of the frame. On advantage of placing the battery pack at the top of the device, as shown here, is that it helps keep the center of gravity rearward in the device. As such, the device is more comfortable for the user and does not tend to slide forward as the user bows his head.

An air mover assembly may also be referred to as a fan assembly and may be used interchangeably herein. The air mover assembly comprises an impeller 140 contained within and supported by a housing. The fan assembly may be powered by a battery or solar cell. The battery may be a rechargeable battery. Wires 136 from the power source are used to supply a current to operate the fan. The fan may be a multi-speed or variable speed fan that can be adjusted to a lower speed, when appropriate, to further reduce the noise from one or more air mover assemblies within an HCD. One of the first or second air mover assemblies can be turned off, when appropriate to further reduce the noise within the device.

The air mover device is connected to the air mover chamber by resilient members 136 to minimize and isolate vibrations and dampen noise caused by an air mover. In the embodiment described herein, the material is an elastic band. Four elastic bands are used to connect the air mover to the air mover chamber but only one is in view in FIG. 2. The members may be bands that may further be made of rubber, or other elastomer such as butyl rubber, natural or synthetic isoprene, chloroprene, nitrile rubber, or styrene-butadiene rubber. The bands hold the fan assembly in place within the air mover chamber in a suspended manner. The bands are connected to the fan assembly by receiving holes located near each corner of the fan. The housing has a rectangular periphery and wherein an elastic band is attached at each of the housing's four corners. The elastic bands can be thread through the holes and tied to the fan assembly. The other end of the elastic bands are connected to the top fan frame by wrapping around a frame receiving post 144 or member. Each elastic band is attached at one end to a different location of the housing of an air assembly and is attached at another end to a different point on the rigid portion of the air mover chamber of the DFVFHCD. Other means may be used to connect the elastic bands to the fan and frame receiving members. In other embodiments, any combination of two or more posts may be used to connect the elastic bands to. The elastic bands can absorb vibrations during operation of the fan assembly and reduce the amount of vibrations transmitted to the rigid portion of the DFVFHCD.

Further illustrated in the air mover chamber is an air duct or passage 142. The duct comprises a flexible material to aid in isolating the fan to limit the vibrations from the fan to the frame. The material comprises a silicone-based material but could be another polymeric material. The duct can further absorb vibrations and help to isolate and dampen the sound coming from the fan. The duct is located on one side of the fan 136. The flexible duct spans from the top to the bottom of the top fan frame and from one side to the other side of the top fan frame. The duct is about the same width of the fan frame and extends away from the fan. As air is pulled into and enters the frame the air is exhausted through the duct, out of the air mover chamber and into the DFVFHCD.

Figure 3:
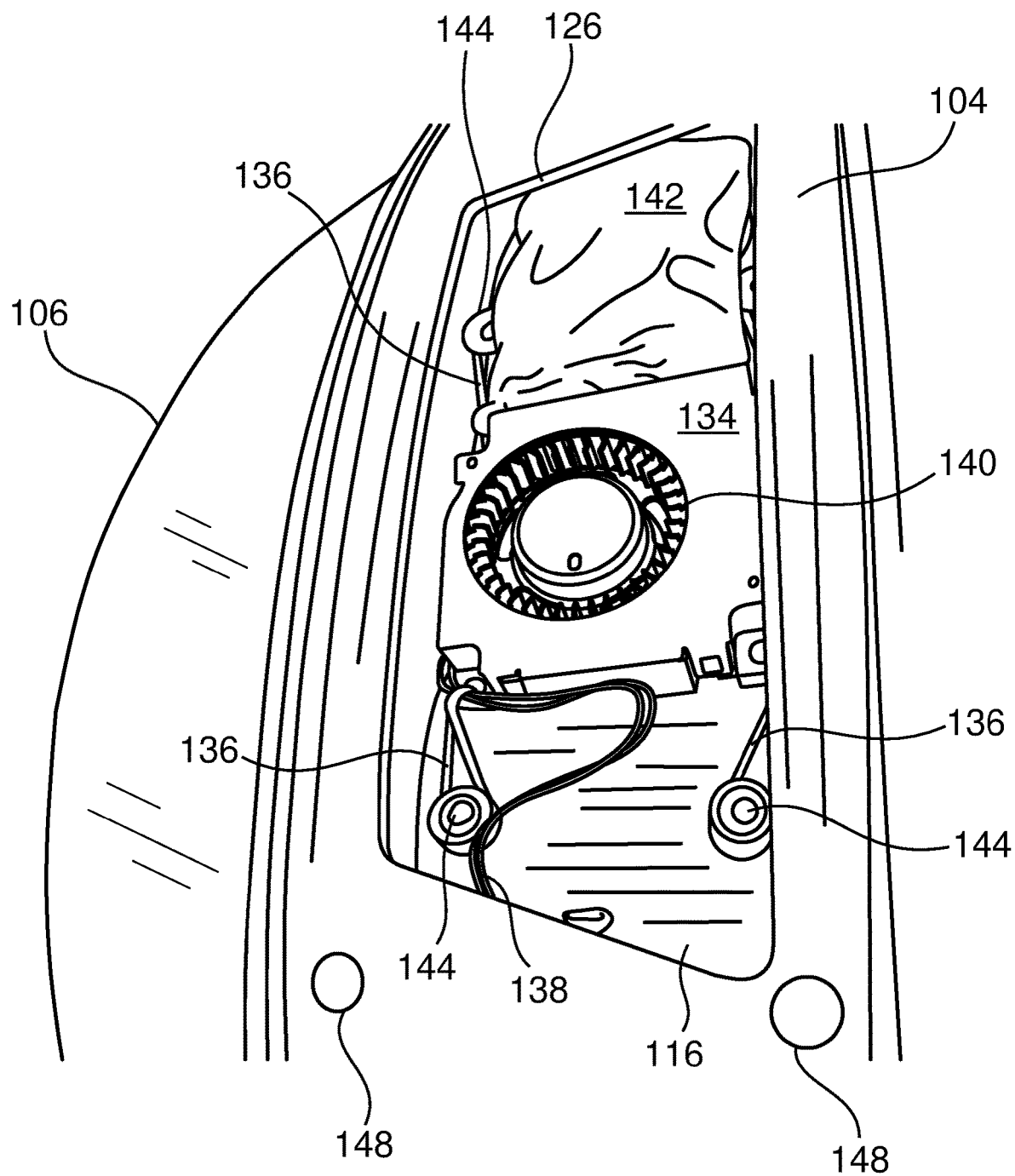
FIG. 3 is a close-up view of the fan assembly in a dual fan variable flow head covering device (DFVFHCD), according to an embodiment of the disclosure.

FIG. 3 is a close-up view of the fan assembly in a dual fan variable flow head covering device (DFVFHCD), according to an embodiment of the disclosure. In this view, multiple elastic members 136 can be seen clearer and how they are attached to the posts 144 on the air mover chamber.

Figure 4:
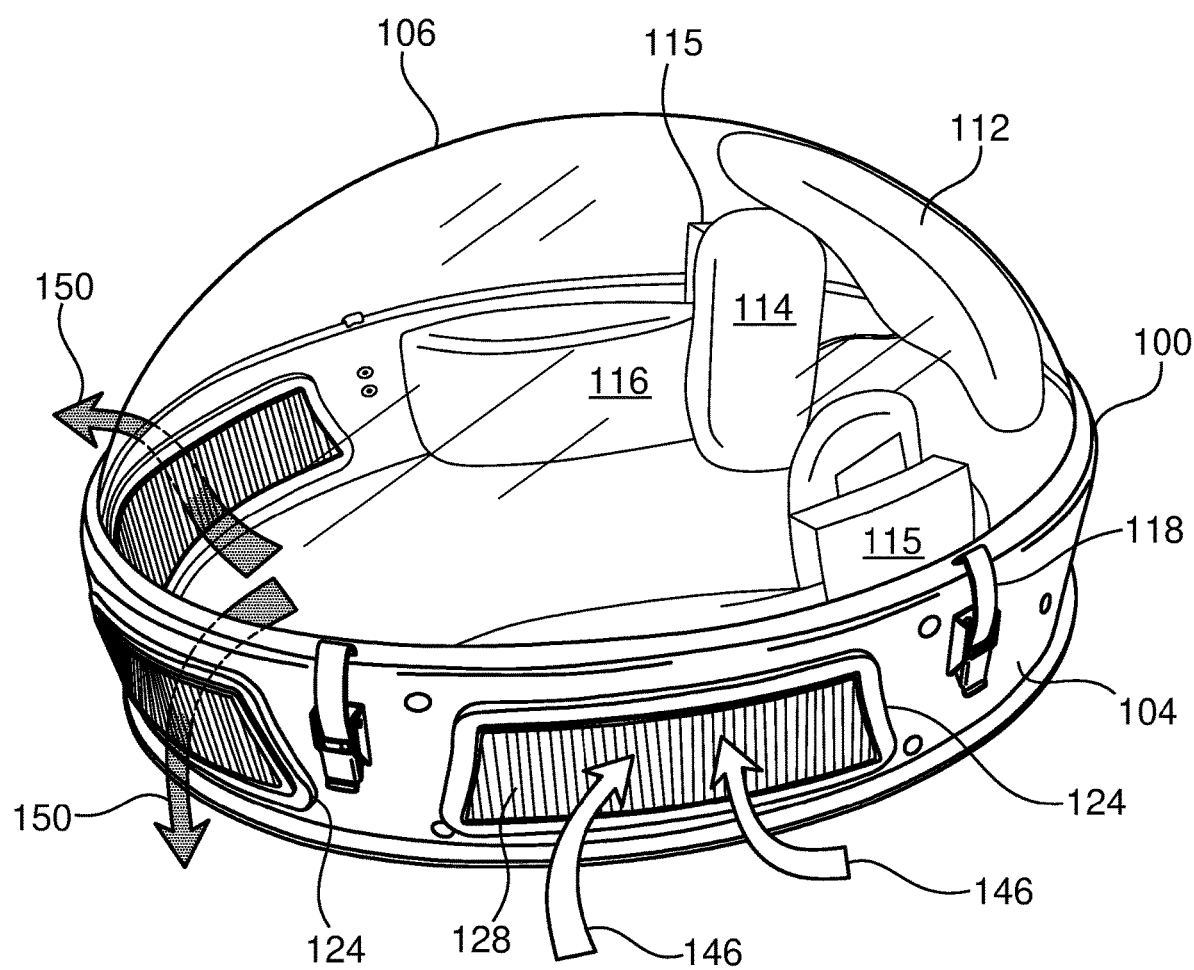
FIG. 4 is a perspective view of the dual fan variable flow head covering device (DFVFHCD) without the fabric and illustrating positive air flow, according to an embodiment of the disclosure.

FIG. 4 is a perspective view of the dual fan variable flow head covering device (DFVFHCD) without the fabric and illustrating positive air flow, according to an embodiment of the disclosure. In operation, air is pulled into the device through a filter 128 located in an aperture 126 in the frame 104. The inlet air entering the device is represented by non-shaded arrows 146. The air enters the device through the permeable fabric 108A, filters located on the side of the frame and into the fan, wherein the air is then further directed into the device through air duct 142 in the air mover chamber then leaves the air mover chamber towards the top of the device near the head of the user. Air inside of the device is then pushed out of the device and through the filters nearest the mouth of the user at the bottom of the frame and is represented by shaded arrows 150.

In some embodiments, the device may be operated in negative air flow mode. In this mode, air is pulled out of the device by a fan and through the filters located on the side of the frame and air enters the device near the mouth of the user at the bottom of the frame. In other embodiments, the fans are reversible, so that the user can switch between positive and negative air flow.

Figure 5:
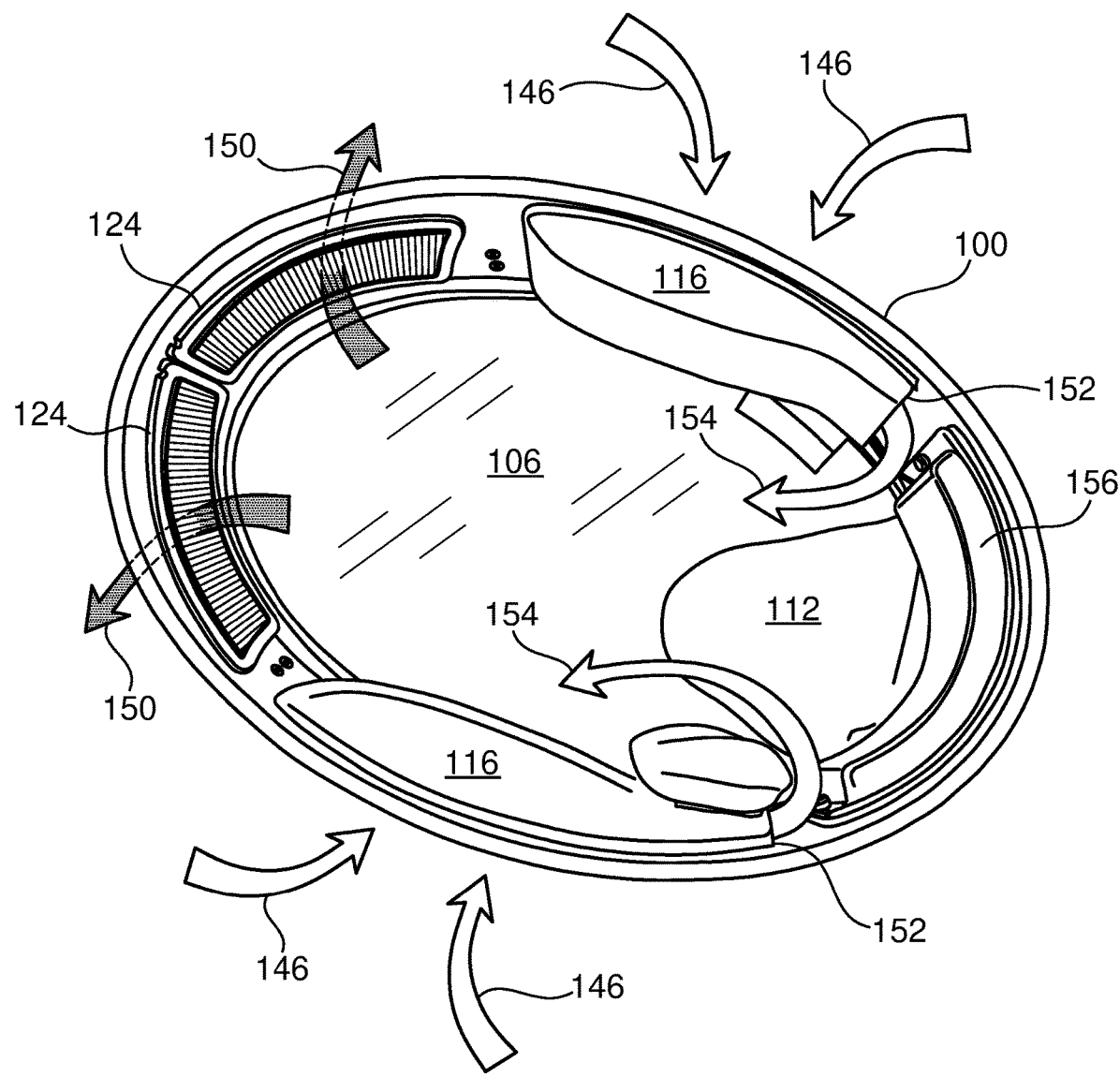
FIG. 5 is a bottom view of the underside of the dual fan variable flow head covering device (DFVFHCD) without the fabric and further illustrating positive air flow, according to an embodiment of the disclosure.

FIG. 5 is a bottom view of the underside of the dual fan variable flow head covering device (DFVFHCD) without the fabric and further illustrating positive air flow, according to an embodiment of the disclosure. The air mover pushes air 146 into the DFVFHCD, through the air mover chamber 116, through air duct 142 and out the air mover chamber at exit 152 to provide filtered air 154 for the user. As filtered air enters the device, air inside of the device is pushed out as filtered exhaust air 150 through exhaust apertures located on opposite sides of the lower portion of the frame.

Also shown in FIG. 5 is the power control box 156. The power control box comprises controls to the device that are in electrical communication with a battery pack and an air mover 134. The power control box also comprises the battery pack and an on/off air mover switch that is located on the outside and at the top of the frame and covered by the fabric component but is able to be operated therethrough the fabric. Other controls may be in the power control box such a flow or pressure sensor, an air flow controller, or a combination thereof to control other components of the device.

Figure 6:
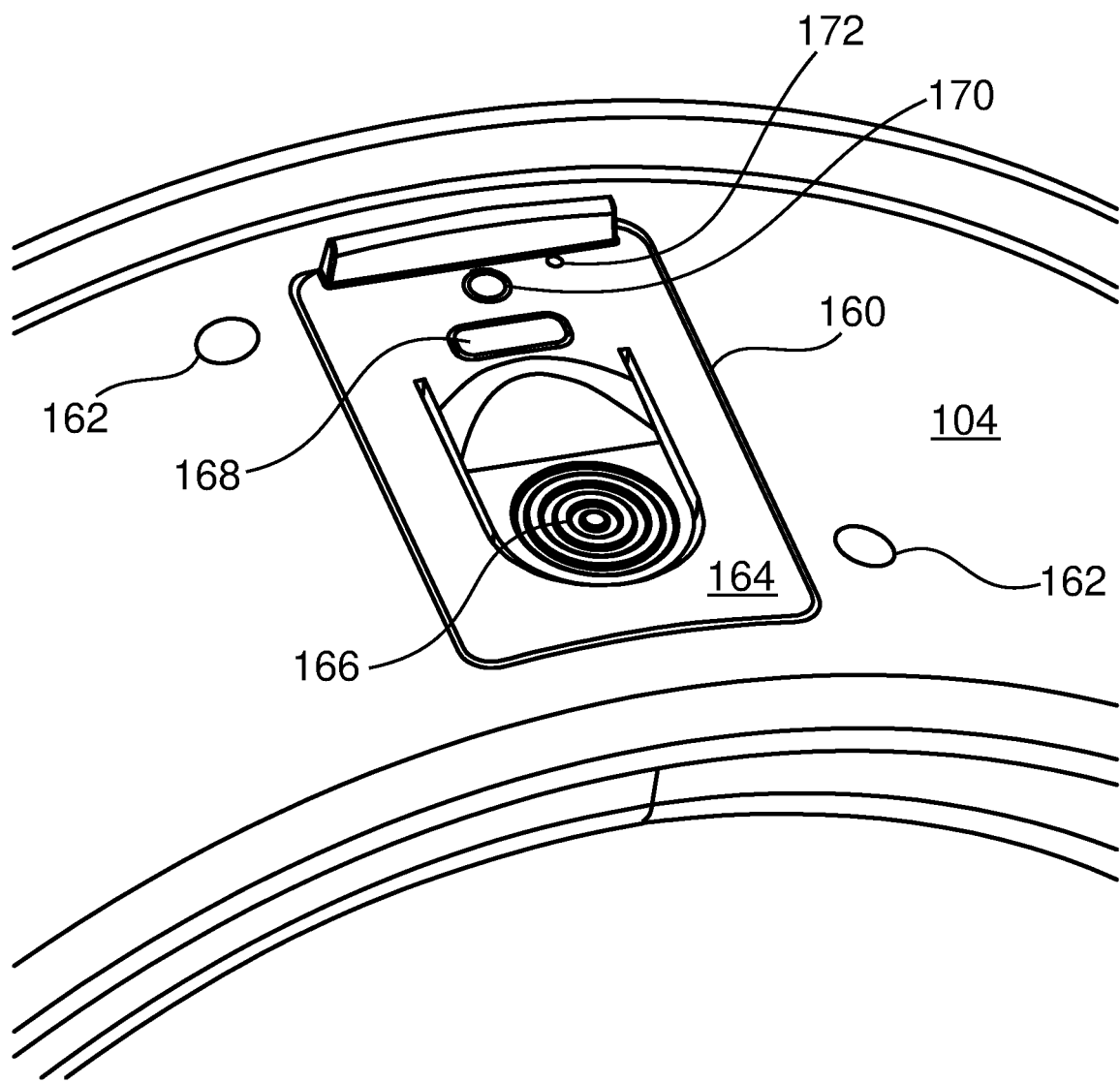
FIG. 6 is a close-up view of the fan power and control device, according to an embodiment of the disclosure.

FIG. 6 is a close-up view of the fan power and control device 164, according to an embodiment of the disclosure.

The control device 164 first comprises a button-like on/off switch 166 that also controls the fan speed as previously described for the SFVFHCD.

The control device further comprises a charge port 168, an LED (light emitting diode) indicator light 170, and a reset button 172.

Single Fan Variable Flow Head Covering Device (SFVFHCD)

The following embodiments relate to a single fan variable flow head covering device (SFVFHCD) capable of negative, positive, or neutral air flow to provide a comfortable and controlled environment for a user. While the following description and drawings depict a single fan embodiment of a variable flow head covering device, it should be noted that the device may have more than one fan.

Figure 7:
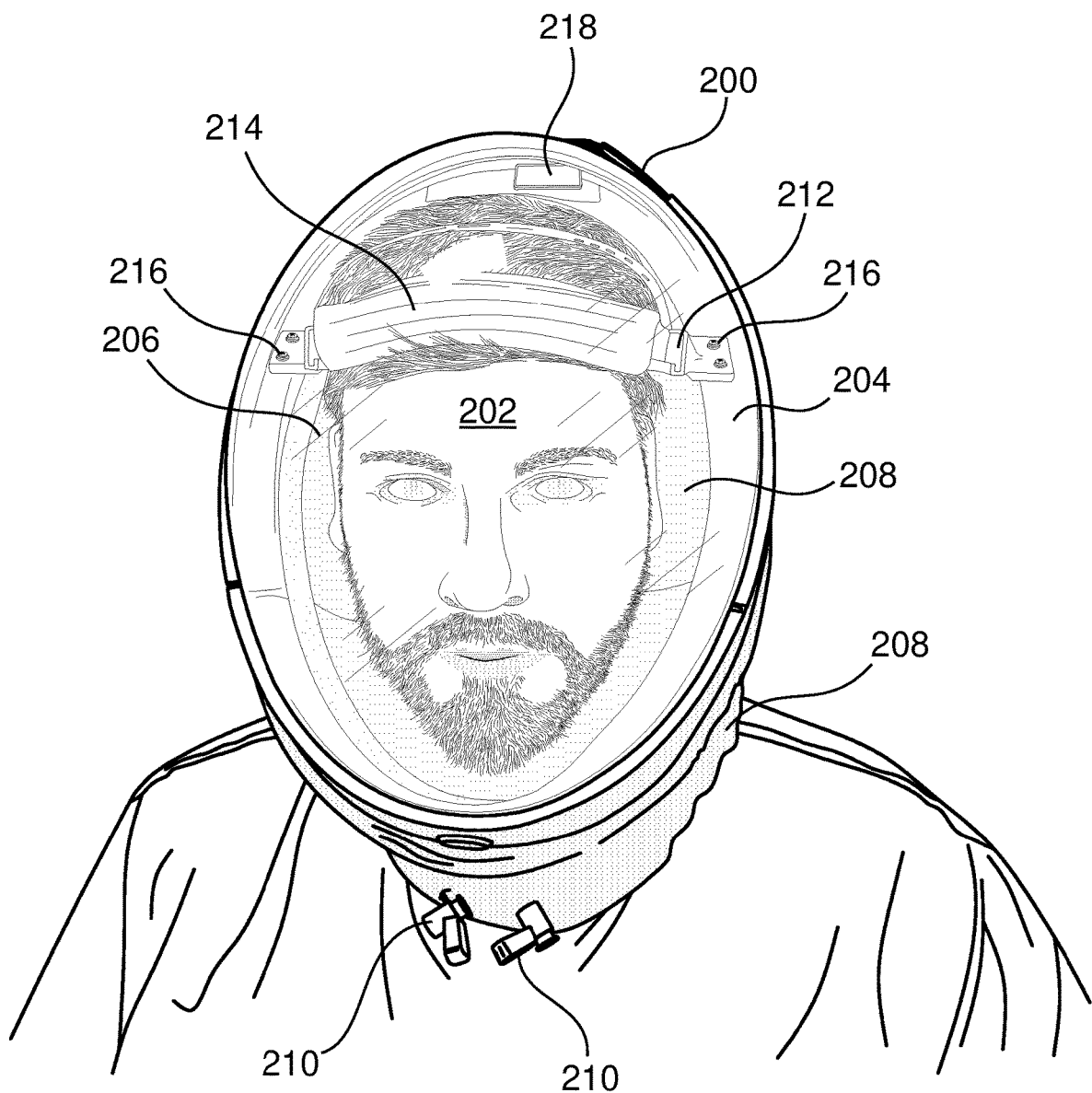
FIG. 7 is a front view of a user wearing a single fan variable flow head covering device (SFVFHCD), according to an embodiment of the disclosure.

FIG. 7 is a front view of a user wearing a single fan variable flow head covering device (SFVFHCD) 200, according to an embodiment of the disclosure. A SFVFHCD 200 is placed over the head of a user 202 as shown. The SFVFHCD comprises a rigid frame 204 and a rigid transparent face shield 206. The frame may be constructed from a rigid or semi-rigid material. The frame is a band-like structure wherein the perimeter of the frame has a generally oval shape but may also be generally circular or some other appropriate shape, such as pear-shaped. The frame encircles the user's head, with an upper portion extending from the user's ear to a point above and to the rear of the user's head and a lower portion extending from the user's ear to a point below and in front of the user's mouth. The frame comprises a lip or groove along the top edge of the frame where the edge of the face shield 206 may be placed in and sit in.

Frame 204 may be constructed from a rigid polymer or metal or a combination thereof. The polymer may comprise fiberglass, carbon fiber, graphene, polyamide, polycarbonate (PC), polyester, high density or low density polyethylene, polyethylene terephthalate (PET), polypropylene (PP), polystyrene (PS), polyurethane, polyvinyl chloride (PVC), polyvinylidene chloride, acrylonitrile butadiene styrene (ABS), polymethylmethacrylate (PMMA), polytetrafluorethylene (PTFE), phenolic, polyetheretherketone (PEEK), maleimide, bismaleimide, polyetherimide, polyimide, plastarch, furan, silicone, polysulfone, rubber, or a combination thereof. The frame may have a generally oval shape and circles a user's head, with a lower half proximate to and spaced apart from the user's chin and an upper half passing above a user's head or forehead.

The face shield 206 is shaped as a hemi-ellipsoid and is preferably set close enough to the face of a user where the user's eyes are unable to focus on the inner surface of the face shield, and thus not interfere with the vision of the user. The face shield may be permanently attached to one side of the frame 204 or may be detachable from frame. If permanently attached, this may be accomplished by using an adhesive, thermal welding, or some other means. If detachable, the face shield may be held securely to the frame using an attaching device, such as a hook and loop fastener (Velcro®), clamps, clasps, clips, buckles, magnets, screws, or other means. The face shield may be able to be snapped into a channel or groove in the frame. The face shield may form an airtight seal with one side of the frame.

The face shield may have a thickness in the range of about 0.05-0.25 inches. In the depicted embodiment, the face shield 206 has a thickness of about 0.12-0.13 inches. The face shield may be constructed from materials that are approved for impact resistance by the American National Standards Institute (ANSI). The face shield may be double-walled, preferably with a vacuum therebetween, for extra insulation. The face shield may comprise a scratch resistant coating or layer on the inner and/or outer surface to prevent abrasions or other damage. The face shield may comprise an anti-fogging coating on the inner or outer surface. A replaceable protective layer may be placed over the outer surface of the face shield. Naturally, the replaceable protective layer should comprise a transparent polymer.

A top portion of the transparent face shield may extend above a user's eyes, a bottom portion extends below the user's mouth and a first and second side portion extend beyond the user's side peripheral vision. The top portion of face shield may extend above a user's forehead and the bottom portion extends below the user's chin.

In a preferred embodiment, the face shield is a rigid transparent polymer or glass. The polymer may comprise an acrylic such as polymethylmethacrylate. The polymer may comprise polystyrene (PS), polycarbonate, glycol modified polyethylene terephthalate (PETG), or cellulose acetate butyrate or a combination thereof. In some embodiments, the face shield is made from a laminate of polymeric films, each contributing to the structural or optical properties of the face shield. As an example, one layer of the laminate may be included to provide shatter resistance.

In some embodiments, the face shield further comprises an area in the line of sight for a user that provides eye correction and improved vision. The SFVFHCD may be able to project images on the internal surface of the face shield. For example, the SFVFHCD may be capable of AR for a user.

In other embodiments, the transparent face shield further comprises a mechanical wiper and motor to clear debris from the front surface of the face shield. In still other embodiments, the transparent face shield further comprises a vibrator to vibrate the face shield to clear debris from the front surface of the face shield. The vibrator may be an ultrasonic vibrator or a pneumatic hammer.

FIG. 7 also illustrates a view of a fabric component 208. The fabric component may also be referred to as a neck skirt, neck seal, neck collar, or neck shroud. The fabric component is attached on the opposite side of the frame from where the face shield is attached to the frame. The fabric component and frame may form an airtight seal. The fabric preferably fits snugly around the neck of a user, such that particulates are not able to pass between the fabric and the neck of the user. The fabric may be flexible or stretchable and may be made of a polymer such as polyester, polypropylene, polytetrafluorethylene (PTFE), polyether ether ketone (PEEK), polyethene-co-chlorotrifluoroethene (E-CTFE), silicone, rayon, spandex, Lycra®, viscose, stretched polytetrafluoroethylene (PTFE), or nylon. The fabric may be made of a natural fabric such as cotton or wool, a composite of a natural fabric and a polymer, or a pharmaceutical grade textile.

As depicted, the fabric component 208 is comprised of a single sheet of fabric. The single sheet of fabric, together with the transparent face shield and the frame, cover a user's entire head and a lower portion of the single sheet of fabric encircles the user's neck and forms a seal therewith. The fabric component comprises a drawstring mechanism 210 to tighten around the neck of a user for better sealing properties to prevent air flow between the fabric and the neck of the user. In some embodiments, it is preferred to include buttons on the drawstrings to hold the drawstrings in the tightened position. The drawstring is to facilitate the fabric component forming a seal around the user's neck. Alternatively, the single sheet of fabric may possess enough stretch to allow the device to be placed over the user's head while leaving the lower portion of the single sheet of fabric intact and still capable of forming a seal around the user's neck. The fabric component may form an airtight seal around the user's neck.

The fabric component shown in FIG. 7 is impermeable to air and is substantially air-tight and does not cover the frame. The fabric is stretched around the base of the frame. The fabric component can be releasably attached by stretching around the frame. The fabric component may comprise an elastic band to facilitate stretching around the frame. The fabric may be baggy and stretchable to allow a user to stretch the fabric with their hand to dab or scratch their face without breaking the seal around the use's neck. The fabric component may be removable and washable.

The fabric component 208 may comprise two or more layers. For example, the fabric may comprise an inner softer second sheet of fabric located between the fabric and the skin of the user. The inner sheet may be soft, washable, and absorbent.

The fabric may be designed so that it can be opened and closed without messing up the hair or makeup of a user. The fabric may comprise a zipper. When the zipper is unzipped, it allows the SFVFHCD to be fit over the user's head, and when zipped facilitates the fabric component forming a seal around the user's neck. Other embodiments may comprise an ultra-stretchable fabric that can be opened widely enough to not mess up the hair or makeup of a user.

In some embodiments, the fabric component may comprise a small foam block or insert that a user can use to scratch their noses without having to remove the SFVFHCD. The foam block or insert may be mounted on the face shield or on the frame. In other embodiments, the fabric portion comprises finger sockets that protrude into the facial area of the SFVFHCD. Finger sockets allow a user to insert their fingers without compromising the environment inside the SFVFHCD but allow the user to scratch or rub an itch.

The SFVFHCD 200 rests on top of the head of a user by way of a head harness 212. The head harness is placed inside and at the top of the SFVFHCD that provides support and cushion between the device and the head of the user. The head harness may comprise a cushion-like material such as cloth, foam, rubber, or other soft material and may be replaceable and washable. Multiple materials, sizes and/or shapes of harnesses may be available, so that the user can select the most comfortable one for their size and shape of head. The head harness may also be adjustable. The harness comprises a band 214 that is positioned over the forehead of the user. The band may be adjustable in diameter to accommodate different sizes of user's heads. The band may further comprise a cover as shown in FIG. 7 to improve the comfort of the user. The cover may be a soft fabric or other material and may be able to absorb sweat if necessary. The harness is affixed to the frame 204 with screws 216 but other mechanisms may be used to secure the harness to the frame such as buttons, clamps, or rivets.

Also shown in the SFVFHCD in FIG. 7 is the fan outlet 218. Air is exhausted from the fan outlet over the face of the user. The air flow will be described in more depth later herein.

Figure 8:
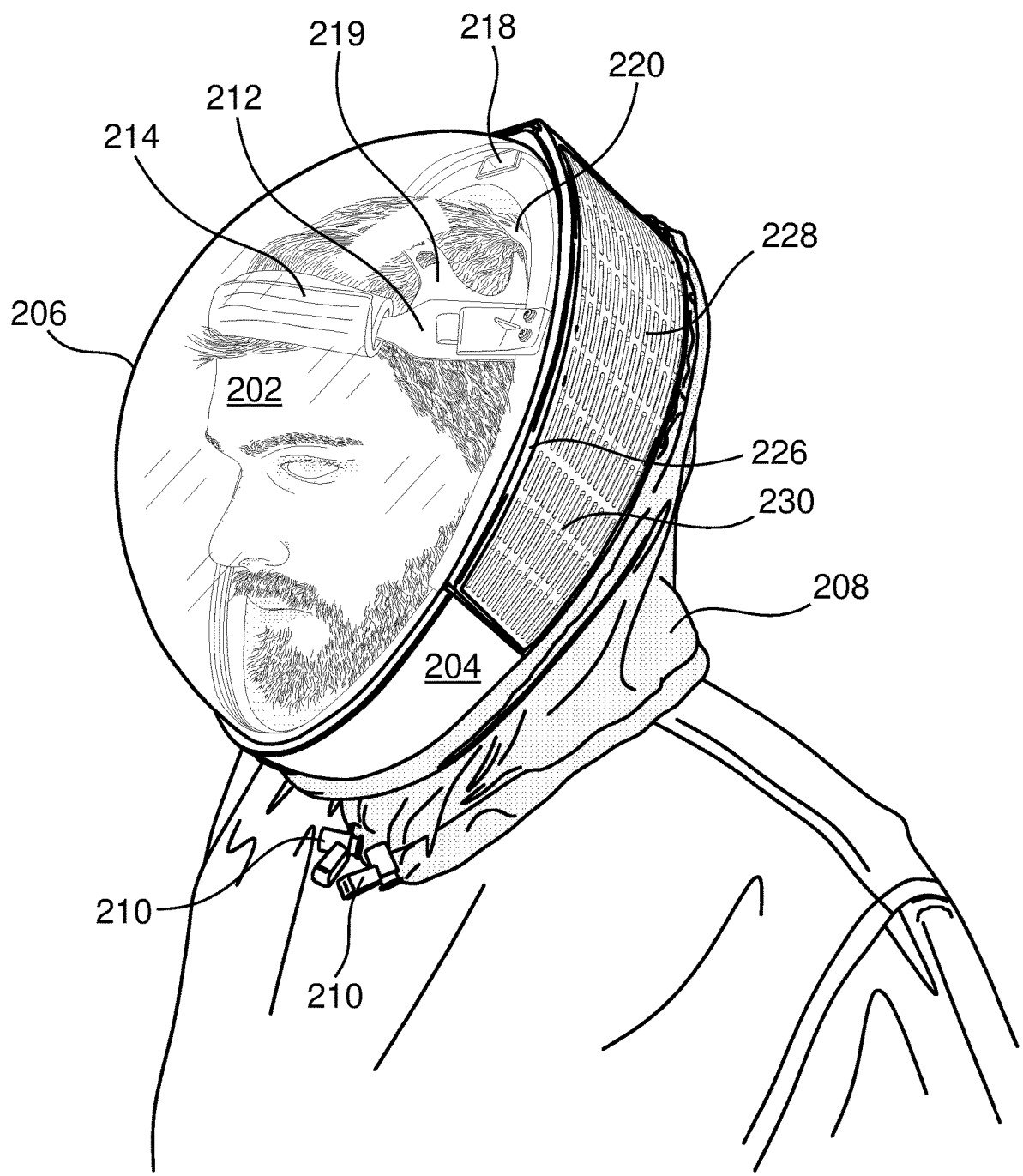
FIG. 8 is a perspective view of a user wearing a single fan variable flow head covering device (SFVFHCD), according to an embodiment of the disclosure.

FIG. 8 is a perspective view of a user wearing a single fan variable flow head covering device (SFVFHCD), according to an embodiment of the disclosure. This view further illustrates how the fabric component can rest on the neck or shoulders of the user. This view also better shows the head harness and a portion of the multiple straps that make up the harness. An additional second strap 219 and third strap 220 are shown. A fourth strap 222 and a fifth adjustable strap 224 are hidden from view but are shown in other figures herein. The straps pass over a top portion of the user's head.

The SFVFHCD further comprises a detachable filter housing 226. FIG. 8 shows the outer surface of the filter housing that holds an inlet and outlet filter on the inner surface of the housing (not shown). The filter housing comprises a plurality of apertures to allow air to enter or be exhausted from the device. The filter housing has an inlet region 228 where air can pass through the housing and inlet filter and an outlet region 230 where air can be exhausted from the device.

Figure 9:
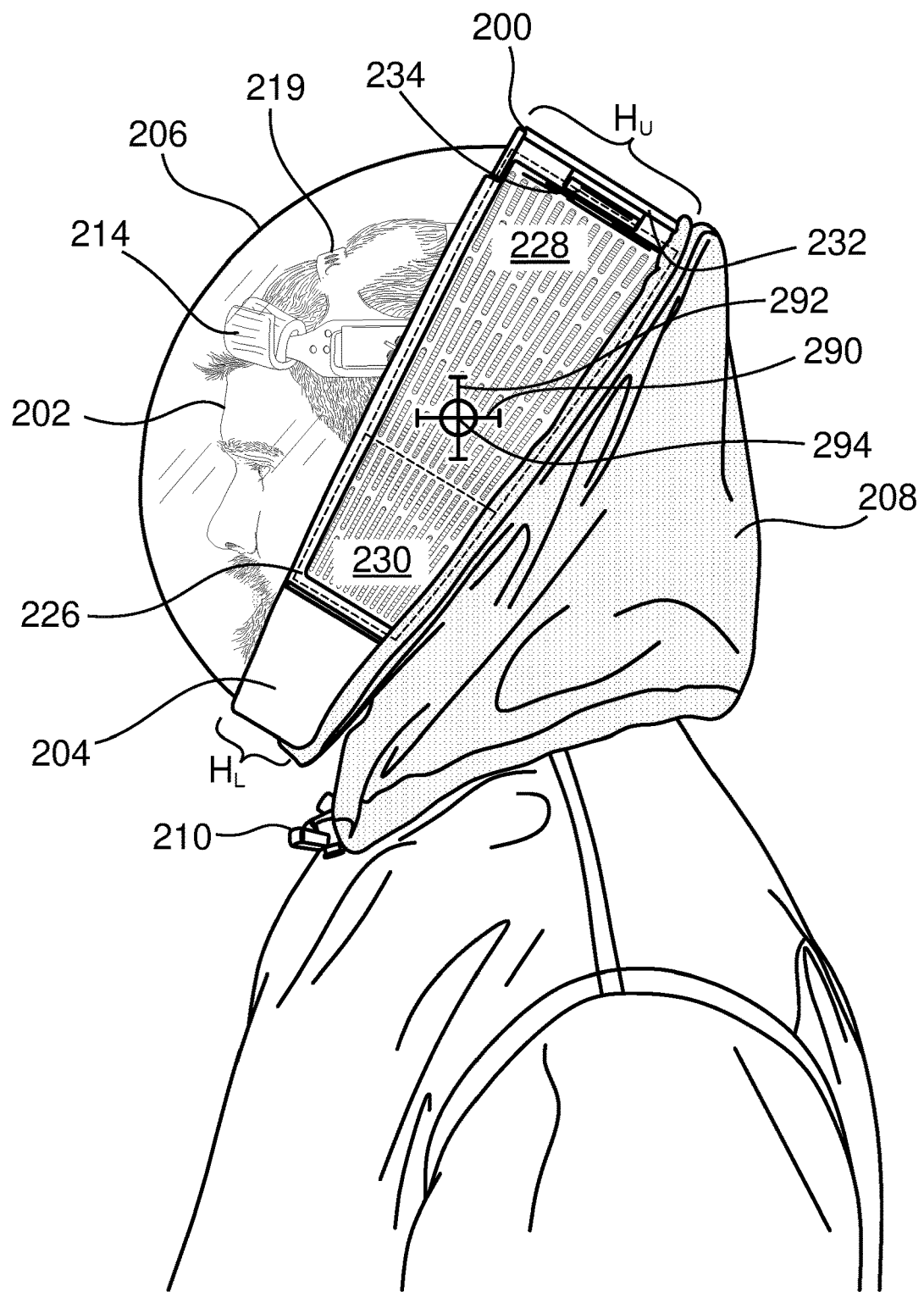
FIG. 9 is a side view of a user wearing a single fan variable flow head covering device (SFVFHCD), according to an embodiment of the disclosure.

FIG. 9 is a side view of a user wearing a single fan variable flow head covering device (SFVFHCD), according to an embodiment of the disclosure. This view further illustrates the detachable filter housing. Dotted lines denote the portion of the filter housing where air enters the device through apertures in the inlet region 228 and the portion of the filter housing where air is exhausted out the outlet region 230. A detachable filter housing is located on each side of the device. The cover 232 to the fan box is shown at the top of the frame behind the head of the user and the mechanism 234 to remove the cover.

The height of the frame (H) in the SFVFHCD is the distance from the bottom of the frame where the fabric component is stretched over to the top of the frame where the face shield is in contact with the frame. As can be seen, the height of the frame in the device varies linearly from where the frame is narrowest at the front at the lower portion of the frame ($H_L$) near the chin of the user to where the frame has the largest height at the upper portion of the frame ($H_U$) at the back of the head where the fan box cover is located as denoted in FIG. 9. The height of the frame at the lowest location is about 1.4-2.4 inches. The height of the frame at the highest location is about 4-5 inches. In an exemplary embodiment, $H_L$ is about 1.8-2.0 inches and $H_U$ is about 4.4-4.6 inches. The ratio $H_U/H_L$ is in the range of about 1.9-2.9. The ratio $H_U/H_L$ may be in the range of about 2.2-2.6. This allows for more of the weight of the SFVFHCD to rest on the head instead of being hung near the chin and for better weight balance. In other embodiments, the height of the frame may vary in a non-linear fashion.

A key aspect of the design of the SFVFHCD is the location of the various components in the device and how it affects the balance of the device and the resulting user's experience. As noted above, lack of balance can be an issue with all-in-one PAPRs. The HCD design disclosed herein is designed with a balance front to back, so as to reduce any discomfort for the user. Preferably, the HCD has a weight distribution ratio between the upper portion of the frame with components mounted thereon and the lower portion of the frame with components mounted thereon. The ratio of the weight of the upper portion of the frame to the weight of the lower portion of the frame is between about 1 to 1.5 and 1.5 to 1. In other embodiments, the ratio is between 1 to 1.25 and 1.25 to 1. In still other embodiments, the ratio is between 1 to 1.1 and 1.1 to 1.

The weight distribution within the SFVFHCD is also preferably designed such that the center of gravity of the device is approximately between the ears of the user. This is illustrated in FIG. 9 by vertical line 292 and horizontal line 290 that cross at approximately the center of gravity (CoG) point 294. The true CoG of the device is actually midway between the two sides. Nevertheless, since the device is symmetrical between the left and right side, reference to the CoG point 294 can be made from the left side view, shown in FIG. 9. A similar CoG point can also be referenced on the right side of the device.

In accordance with the preferred embodiment, this CoG is located not more than 7 cm above or below the ear of the user. More preferably, the CoG is located not more than 3 cm above or below the ear. Also, the CoG is preferably located not more than 7 cm behind or in front of the user's ear. More preferably, the CoG is located not more than 3 cm behind or in front of the user's ear.

The position of the CoG may be controlled by the location of the components on the frame of the device such that the CoG may be raised or lowered or moved towards the face mask or back to the rear of the device towards the back of the head of the user or a combination thereof. For example, the CoG point 294 may be moved upwards or lowered along vertical line 292. The CoG point may be moved forward or rearward along horizontal line 290.

Figure 10:
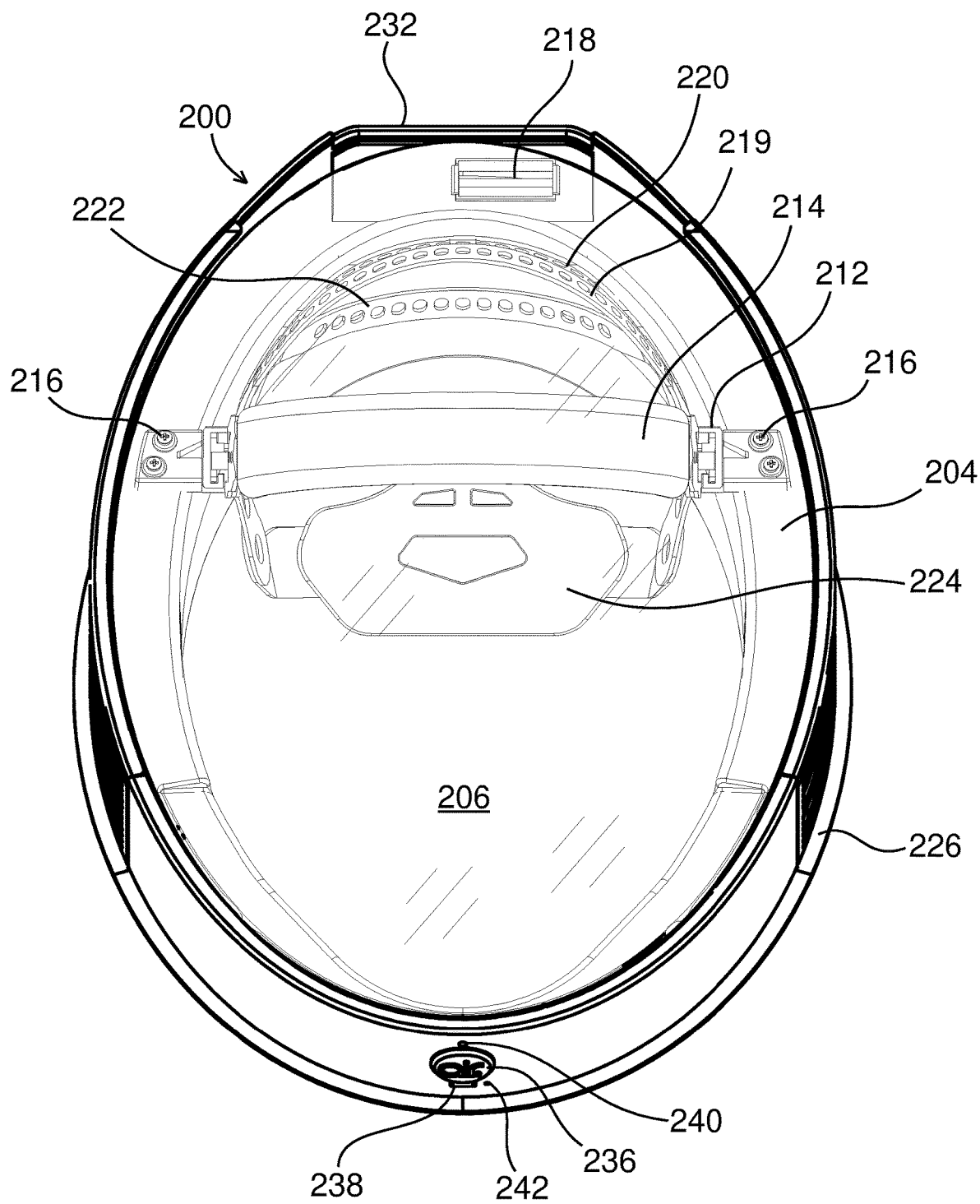
FIG. 10 is a front view of a single fan variable flow head covering device (SFVFHCD) without the fabric, according to an embodiment of the disclosure.

FIG. 10 is a front view of a single fan variable flow head covering device (SFVFHCD) 200 without the fabric, according to an embodiment of the disclosure. This view shows the electronic controls of the device. At the bottom portion near the chin, a circular-shaped power button 236 is shown that can turn on and off the power to the fan when depressed. The controls may also be designed to be able to control the fan at variable speeds. The controls may only allow one speed thus the button 236 would be an on/off switch. In other embodiments, the fan can be manually operated at different speeds. By depressing the button, the fan may turn on at the highest speed. A second press of the button decreases the fan speed to a middle speed. A third press of the button changes the fan speed to low. By pressing it again the speed increases to high speed and the process is repeated. By depressing and holding the button for one second or more turns the fan off. More than three fan speed rates may be possible.

The control device further comprises a charge port 238. In a preferred embodiment, the charge port to recharge the batteries in the battery pack is a USB-C plug. The charge port may be a Lightning, USB-A, USB 3.0 A SS, USB B, USB 3.0 B SS, USB mini-A, USB mini-AB, USB mini-B, USB micro-AB, USB micro-B, USB 3.0 micro-B SS plug or other type of plug. Rechargeable batteries are mounted to the lower portion of the frame at its bottom and behind the charge port.

The control device further comprises an LED (light emitting diode) indicator light 240. The indicator light communicates various states of the device. For example, when the LED is blue the device is charging, when the LED is white the device is on, when the LED is green the device is fully charged, and when the LED is red the battery is low. Other combinations of colors and indicators may be used.

The control device further comprises a reset button 242. This is the button to reset the device in the event the electronics freeze or gets into an undesired loop.

The control device may comprise other controls to operate components of the SFVFHCD such as lights, sensors, or electrochromic light shading films, volume control, or video control. The control device is in electronic communication with one or more batteries and with the fan.

Figure 11:
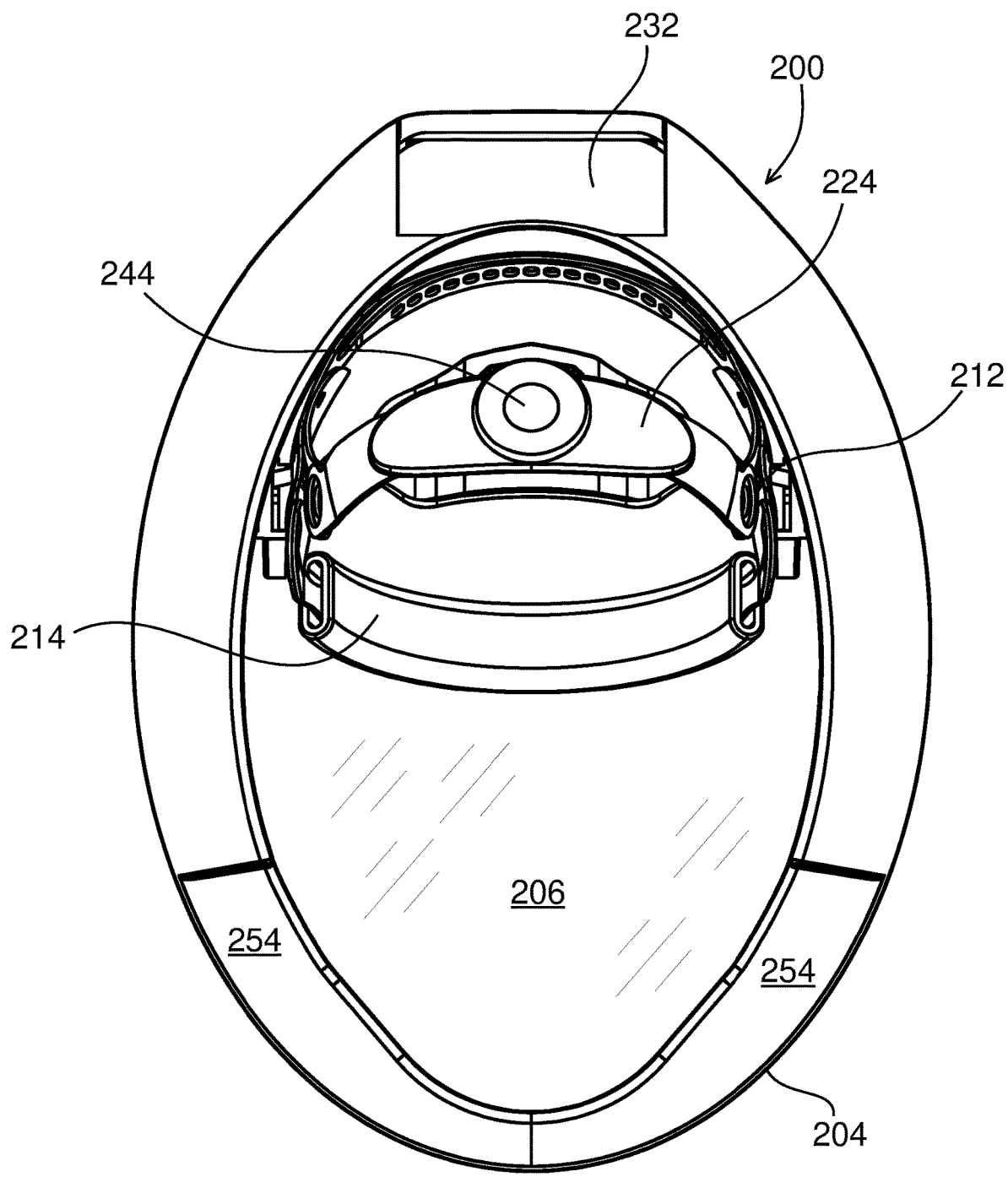
FIG. 11 is a bottom view of a single fan variable flow head covering device (SFVFHCD) without the fabric, according to an embodiment of the disclosure.

FIG. 11 is a bottom view of a single fan variable flow head covering device (SFVFHCD) without the fabric, according to an embodiment of the disclosure. This view better shows the cover to the fan box 232 and the head harness adjusting mechanism 244. In this embodiment the adjusting mechanism is a knob that can be turned to loosen or tighten one or more of the straps in the harness around the head of the user. The straps are adjustable in length to accommodate different sizes of user's heads. Also shown is the battery compartment 254 where batteries are located to power the device and are in electrical communication with the fan and control device.

Figure 12:
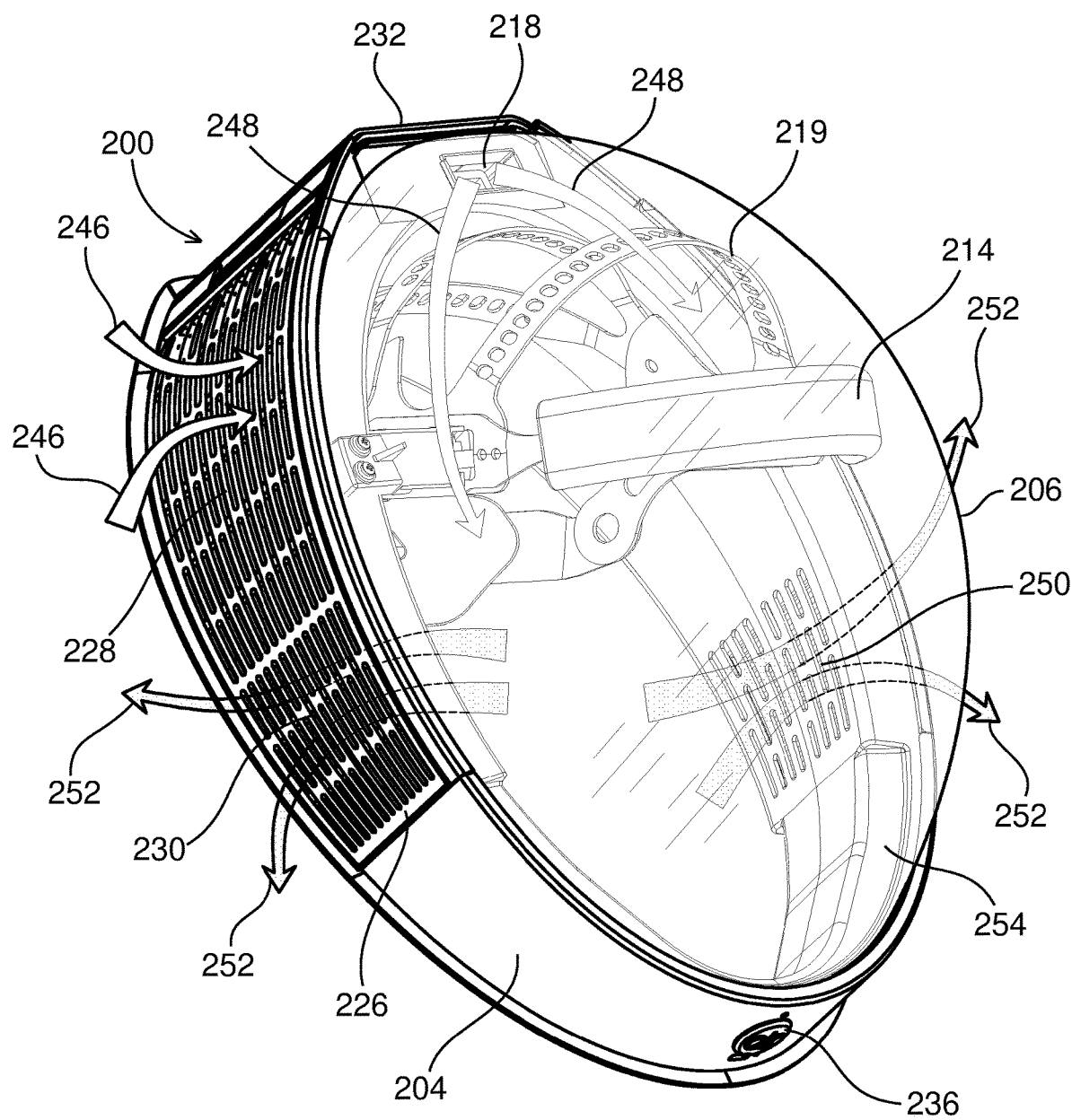
FIG. 12 is a perspective view of the single fan variable flow head covering device (SFVFHCD) without the fabric and illustrating positive air flow, according to an embodiment of the disclosure.

FIG. 12 is a perspective view of the single fan variable flow head covering device (SFVFHCD) without the fabric and illustrating positive air flow, according to an embodiment of the disclosure. In operation, air is pulled into the device through the apertures of inlet portion 228 of the filter housing as represented by non-shaded arrows 246. Although only one side is shown where air enters the device, this is also occurring on the opposite side of the device. The air is then passed through a filter (not shown) and directed through a duct and towards the fan (not shown) which then directs the inlet air out the fan outlet port 218 into the device and over the forehead of the user as represented by non-shaded arrows 248. The inlet air and the exhaled air from the user is then passed through a plurality of exhaust apertures 250 on the inner surface of the frame where the air passes through a second filter then through an exhaust aperture on the outside surface of the filter housing 230 where the air is pushed out of the device. This is illustrated by shaded arrows 252. The inlet air may pass across the face of the user or along the inner surface of the transparent face mask 206.

In some embodiments, the device may be operated in negative air flow mode. In this mode, air is pulled out of the device by a fan and through port 218 and aperture region 228 located on the outer side of the filter housing. Air enters the device near the mouth of the user through the apertures in area 230. In other embodiments, the fan is reversible, so that the user can switch between positive and negative air flow.

Figure 13:
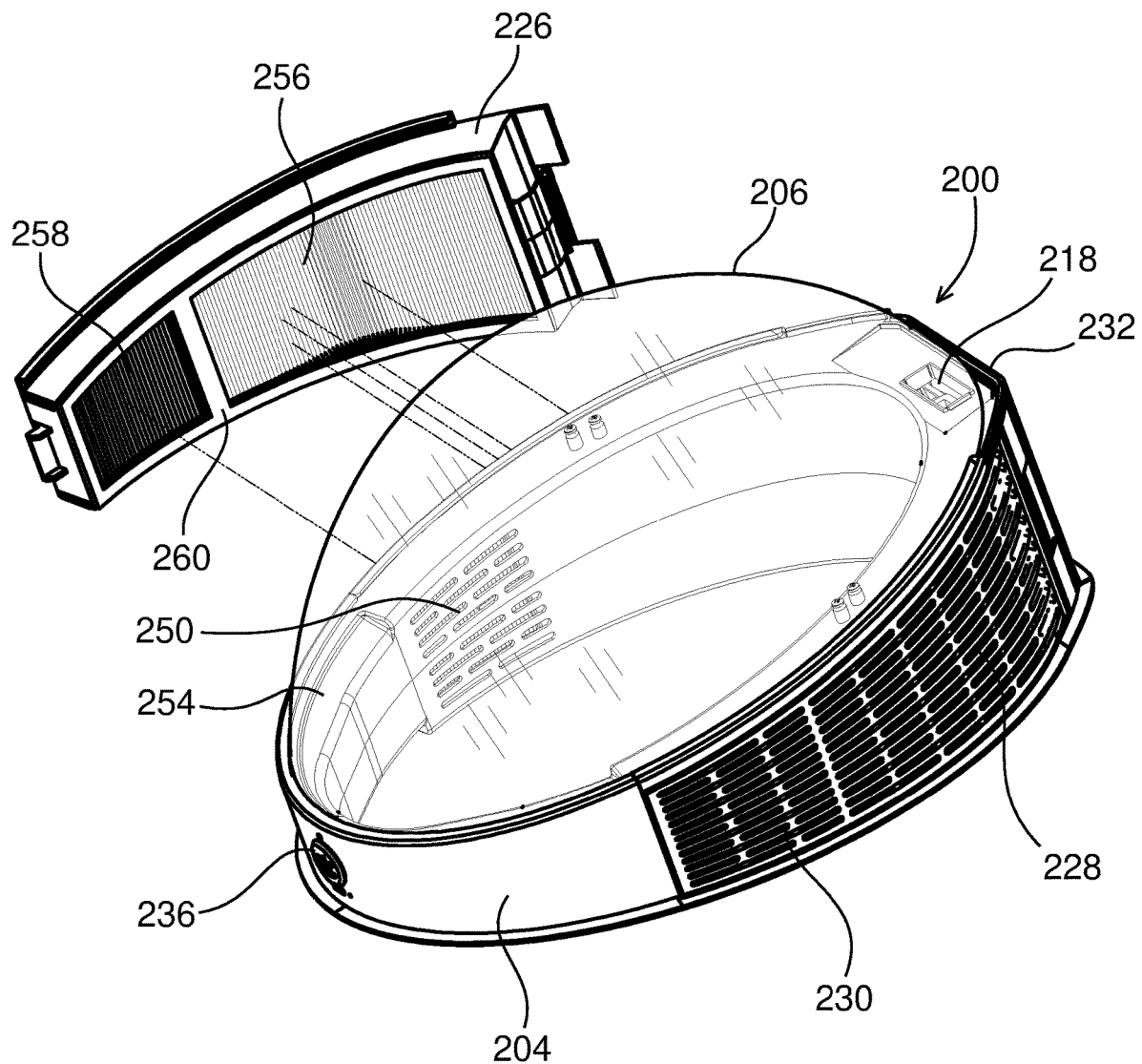
FIG. 13 is a perspective view of a single fan variable flow head covering device (SFVFHCD) without the fabric and head harness with an exploded view of the filter housing with filters, according to an embodiment of the disclosure.

FIG. 13 is a perspective view of a single fan variable flow head covering device (SFVFHCD) without the fabric and head harness with an exploded view of the filter housing with filters, according to an embodiment of the disclosure. The filter housing 226 is mounted to the frame but is removable from the frame and comprises a first inlet filter 256 and a second outlet filter 258. The filters may be glued to the housing to form a substantially airtight seal. Inlet filter 256 is adjacent inlet apertures of inlet portion 228 and outlet filter 258 is adjacent the outlet apertures of outlet region 230 and exhaust apertures 250. The filter housing further comprises an elastic gasket 260 for the filter housing to create a seal with the frame to prevent cross contamination of inlet and exhaust air. The gasket may be made of rubber or silicone or other resilient material that is impermeable to air. The air inlet filters communicate with ambient air outside the device and on the other side with an inlet duct. The air outlet filters communicate with air inside the device and on the other side with ambient air outside the device. The filter housing, gasket, and air inlet and outlet filters form a filer assembly.

Figure 14:
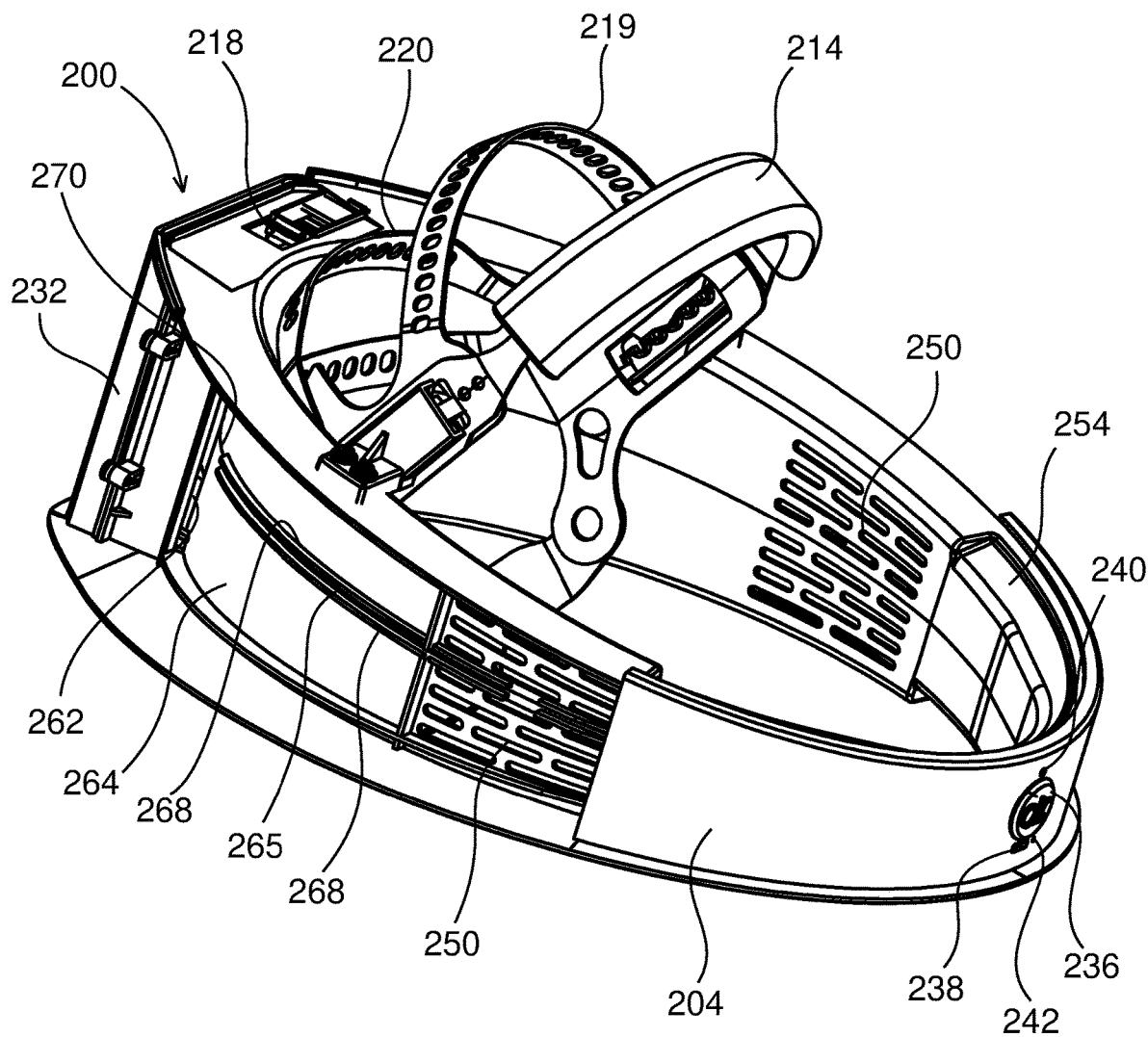
FIG. 14 is a perspective view of the single fan variable flow head covering device (SFVFHCD) without the fabric, facemask, and filter housing, according to an embodiment of the disclosure.

The inlet and outlet filters may be 50-99.99% efficiency particulate filters. In one embodiment, the inlet filters may be 95-99.99% efficiency particulate filters. In some embodiments, the inlet filters may be >99.9% efficiency particulate filters. In an exemplary embodiment, the inlet filters are 99.97% National Institute for Occupational Safety and Health (NIOSH) particulate filters. The inlet filters may be HEPA filter. The filters are pleated to increase the surface area of the filter to increase filtering efficiency and to prevent air flow from being restricted. The surface area of the filters in the device may be greater than 30 $inch^2$. In other embodiments, the surface area of the filters in the device may be greater than 100 $inch^2$. In a preferred embodiment, the surface area of the filters in the device may be greater than 200 $inch^2$. In other embodiments, the filters may not be pleated. The inlet filter is adapted to block the passage of a virus, bacteria, smog, noxious gas, poisonous gas, smoke, or a combination thereof, to purify the incoming air for a user. The outlet filter may also filter the exhaust air. This is beneficial if a user has an infectious disease which would prevent non-wearers of the SFVFHCD from being infected. This device could be used in a hospital, nursing home, or other facility by an infected nurse, doctor, or other health care worker without the risk of infecting the patients that they are treating that may have compromised immune systems. The filters can be readily changed depending on the environment where the device is being used FIG. 14 is a perspective view of the single fan variable flow head covering device (SFVFHCD) without the fabric, facemask, and filter housing, according to an embodiment of the disclosure. In this view, the filter housing has been removed to better illustrate the path of inlet air into the device. As inlet air passes through inlet filter 256, the air enters air duct 262 where the air then enters the fan and is redirected out exhaust port 218 and into the device. The inlet filter is disposed adjacent the inner wall 264 of the frame and channel 266. Channel 266 is formed by two raised ridges 268 that are disposed along the length the inner wall. The channel also acts as a conduit for electrical wire 270 that electrically couples the fan with the battery pack and control device.

Figure 15:
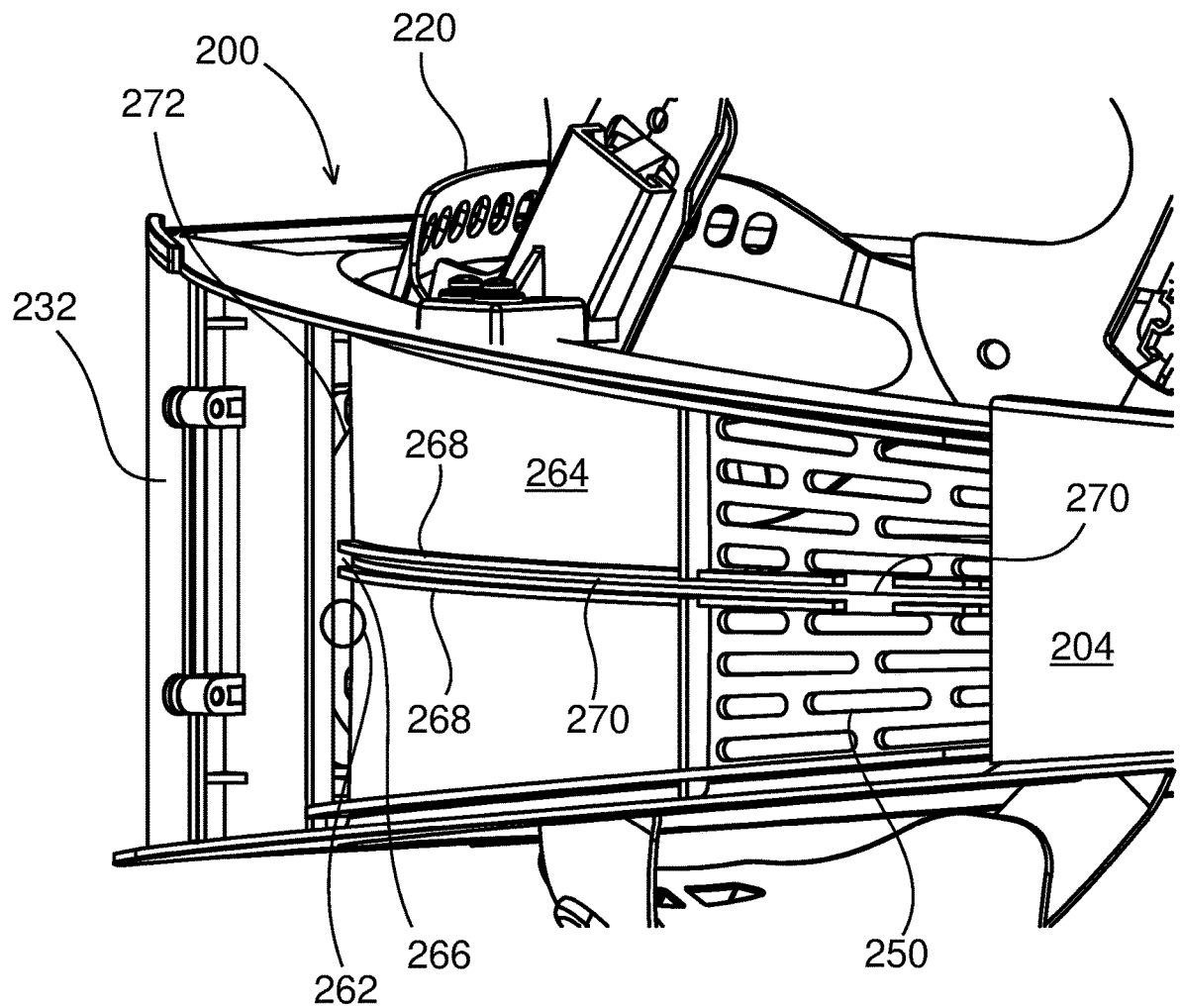
FIG. 15 is a close-up view of the single fan variable flow head covering device (SFVFHCD) without the fabric, facemask, and filter housing, according to an embodiment of the disclosure.

FIG. 15 is a close-up view of the single fan variable flow head covering device (SFVFHCD) without the fabric, facemask, and filter housing, according to an embodiment of the disclosure. In this view, the air duct 262 is better illustrated where inlet air can enter the fan and be redirected. A portion of the fan 272 can be seen within the air duct. Also shown is a better view of the channel 266 where electrical wire 270 is located. The wire also enters the air duct to be connected and provide power to the fan.

Figure 16:
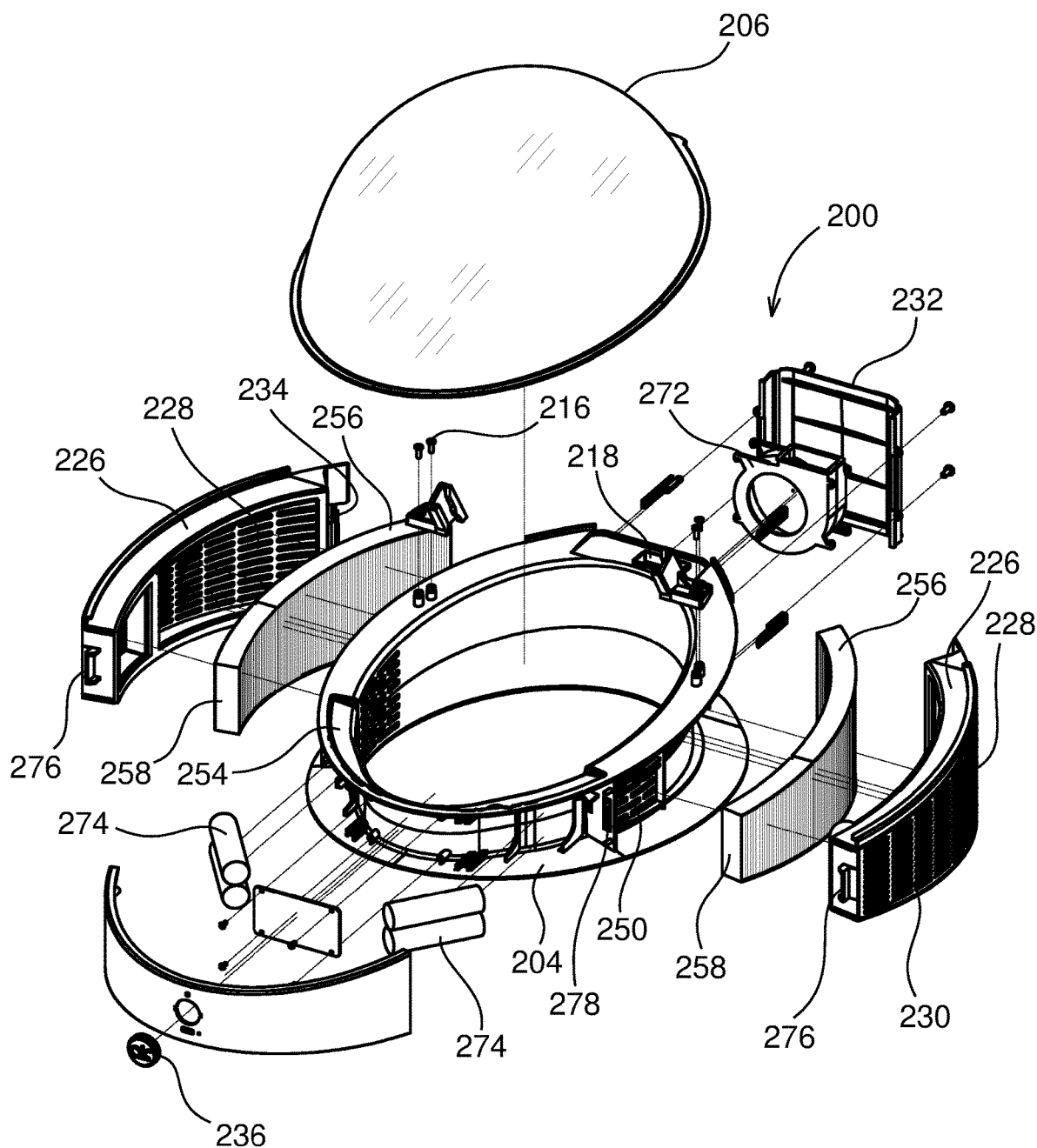
FIG. 16 is an exploded view of the components of the single fan variable flow head covering device (SFVFHCD) without the fabric and head harness, according to an embodiment of the disclosure.

FIG. 16 is an exploded view of the components of the single fan variable flow head covering device (SFVFHCD) without the fabric and head harness, according to an embodiment of the disclosure. This view shows the various components of the device and how the components are arranged with respect to each other. This view shows how the fan is mounted to the upper portion of the frame and between the frame and the cover 232. The cover is secured to the frame with screws. Other methods to affix the cover are possible. The cover and frame form a compartment or box for the fan to be located. A gasket of a resilient material may be disposed between the frame and fan or between the fan and cover to limit vibrations during the operation of the fan.

Further shown in FIG. 16 is where the batteries 274 are located. In this embodiment, 4×18650 cylindrical batteries are used but other battery form factors may be used such as prismatic batteries or 26650 cylindrical batteries. In a preferred embodiment, the batteries comprise one or more rechargeable batteries. The rechargeable batteries may comprise a rechargeable Li ion-based battery such as a $LiCoO_2$, $LiFePO_4$, $LiMnNiCoO_2$, $LiNiCoAlO_2$, or $LiMn_2O_4$-based battery. The rechargeable batteries may comprise a nickel-cadmium or nickel metal hydride battery. In other embodiments, the battery pack may comprise a non-rechargeable primary battery such as an alkaline cell.

On one end of the filter housing 226 is a raised insert component 276 that is inserted into a receptacle 278 in order to securely hold the filter housing in place. A filter housing receptacle is located on each side of the frame to secure each housing. On the other end of each housing is a clip 234 to further secure the housing to the frame.

Figure 17:
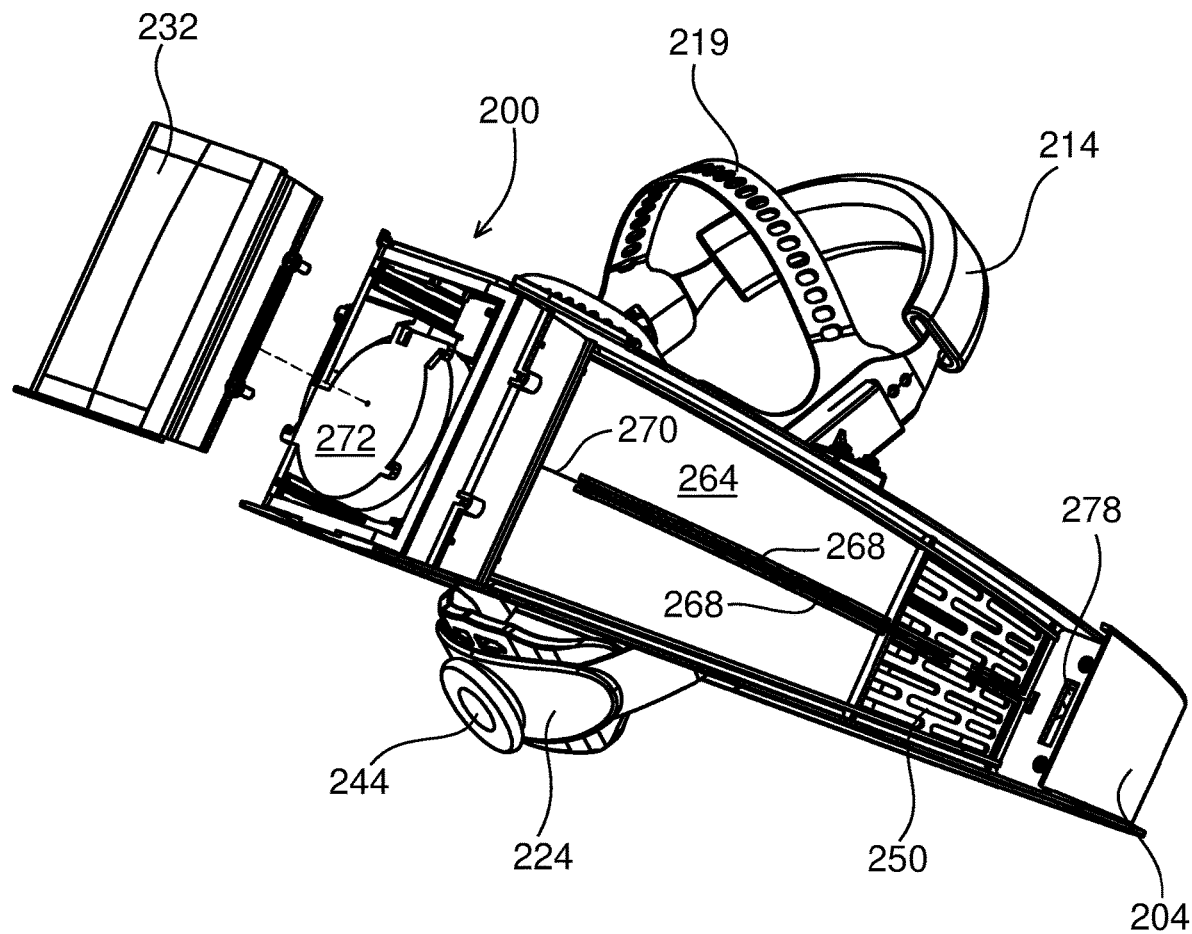
FIG. 17 is a rear view of the single fan variable flow head covering device (SFVFHCD) without the fabric, facemask, filter housing and fan cover, according to an embodiment of the disclosure.

FIG. 17 is a rear view of the single fan variable flow head covering device (SFVFHCD) without the fabric, facemask, filter housing and fan cover, according to an embodiment of the disclosure. This view further illustrates how the fan 272 is situated in the fan compartment and how the cover 232 is situated over the fan. Also shown is a view of receptacle 278 where the insert on each filter housing is received to help secure the housing to the frame.

Figure 18:
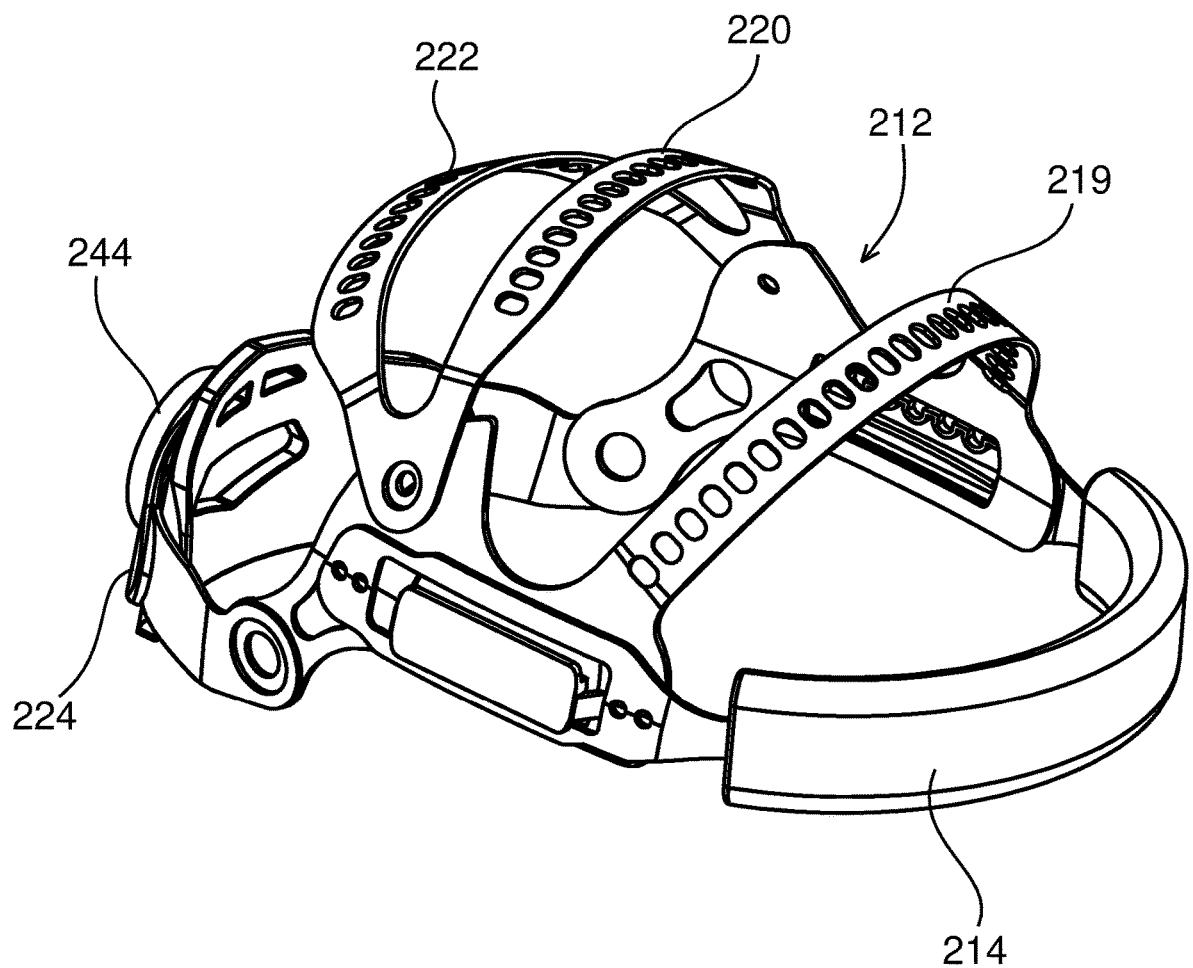
FIG. 18 is a perspective view of the head harness of the single fan variable flow head covering device (SFVFHCD), according to an embodiment of the disclosure.

FIG. 18 is a perspective view of the head harness 212 of the single fan variable flow head covering device (SFVFHCD), according to an embodiment of the disclosure. In this embodiment, five straps are shown with a front band 214, a rearward strap 224 with adjustable mechanism 244 and three top straps 219, 220, and 222. In other embodiments, more or fewer straps may be used. The harness may be made of a pliable material that is comfortable for the user.

Preferably, the harness can be adjusted to best fit the user, i.e., to accommodate for different head sizes. This can be done by adjusting the diameter of the band 214. This can also be accomplished by adjusting the length of one or more of the straps. Making these adjustments to the head harness can also adjust the position of the CoG of the device, to preferably place the CoG within 7 cm of the user's ear.

Figure 19:
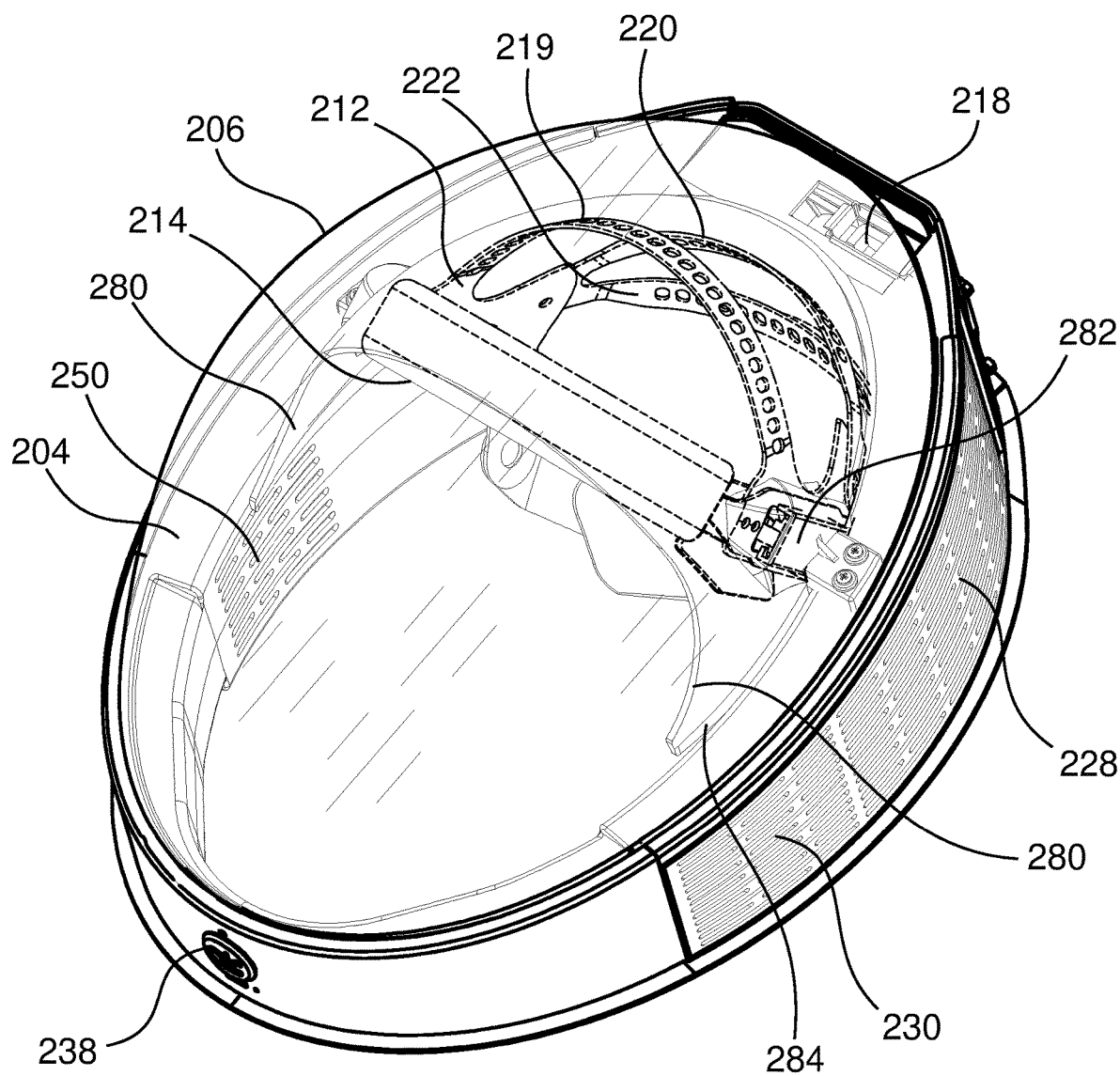
FIG. 19 is a perspective view of the single fan variable flow head covering device (SFVFHCD) without the fabric and with the head harness cover, according to an embodiment of the disclosure.

FIG. 19 is a perspective view of the single fan variable flow head covering device (SFVFHCD) with the head harness cover, according to an embodiment of the disclosure. The fabric component has been removed for clarity. This view illustrates the addition of a head harness cover 280 and how it can be used to make the HCD more aesthetically pleasing. The head harness cover is located on the inside and upper portion of the device and disposed between the face shield 206 and the head harness 212. The head harness cover is clipped into place and placed over and secured with the head harness adaptor 282 on each side of the device. A bottom flat edge 284 of the head harness cover rests on the surface of the inside of the frame.

The head harness cover can be used to mostly hide the multiple straps of the head harness. The dotted lines in FIG. 19 illustrates the portion of the head harness that would be hidden from view of an opaque head harness. A small portion of the front band 214 can be seen just below the head harness cover. The head harness cover may be of any color or multiple colors to personalize the SFVFHCD for each user. Pattern, pictures, images, or other designs may be on the head harness cover such as collegiate or sports logos or company logos. In some embodiments, lights or other electronic communication or safety equipment may be combined with the head harness cover.

Figure 20:
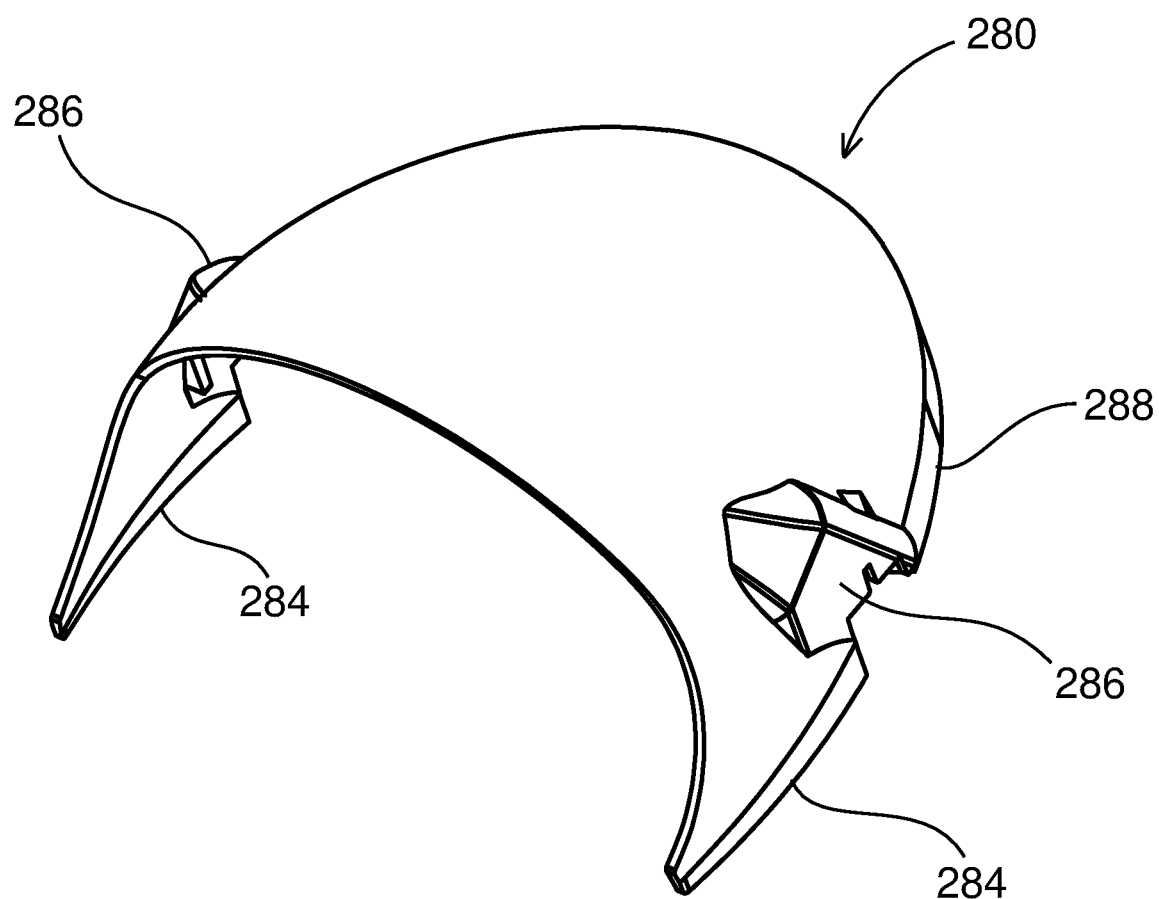
FIG. 20 is a perspective view of the head harness cover, according to an embodiment of the disclosure.

FIG. 20 is a perspective view of the head harness cover, according to an embodiment of the disclosure. In this view of only the head harness cover, the front flat edges 284 can be more easily seen that rest on the surface of the frame. Also shown are the head harness cover housings 286 that are placed over the head harness adaptor 282 that aid in securing the head harness cover in place. Also shown is a rear flat edge 288 that also rests on the frame to help secure the head harness cover in place. The head harness cover can also be used to display information, such as the user's name, the company name and/or logo, etc.

Flip Up Face Shield for a Variable Flow Head Covering Device (VFHCD)

The VFHCDs described herein may further comprise a face shield that can easily be opened and closed for access to the face of a user. The face shield may be connected by a movable joint underneath the fabric portion to allow for the face shield to be easily opened without removing the face shield entirely from the VFHCD. Alternatively, the movable joint may be a fabric, strap hinge, butt hinge, concealed hinge, piano hinge, offset hinge, overlay hinge, hidden barrel hinge, or a scissor hinge. In a preferred embodiment, the movable joint is a spring-loaded hinge. The spring-loaded hinge can hold the face shield open without the user having to do so. The face shield can be readily opened and closed for quick access to the face of the user. The face shield may be able to snap in and out of the frame as it is opened and closed to secure the face shield. The fabric may be flexible or slide up the face shield to allow for opening of the face shield.

In other embodiments, the moveable joint may be located at the bottom of the face shield and connected to the bottom of the frame. The moveable joint may be located on either side of the face shield such that the face shield can be opened from the right or left of the user. Preferably, the VFHCD includes a latch or other locking means, such as magnets, to keep the face shield in place when not opened.

Environmental Control for a Variable Flow Head Covering Device (VFHCD)

The following embodiments describe systems and methods to provide a controlled temperature and breathing environment within a VFHCD by conditioning the air within the HCD with an environmental control component. The environmental control component can control the air flow, temperature, or humidity or a combination thereof within the device.

The VFHCDs described herein that may comprise a pocket. One or more pockets are preferably located over an intake filter or intake fan where air passes through before entering the VFHCD. The pockets may be located on the permeable portion 108A of the fabric in the DFVFHCD.

The pocket may further comprise a thermoelectric cooler. The thermoelectric cooler may be designed to heat or cool incoming air. The thermoelectric cooler may be combined with a heat exchanger device to increase efficiency of heat transfer between incoming and exhaust air. The thermoelectric cooler may be used to control the temperature of the air to prevent fogging on the face shield or humidity build-up in the VFHCD. The inner surface of the face shield may comprise an anti-fogging layer. The thermoelectric cooler may operate on the principle of the Peltier effect.

The pocket may comprise an energy recovery or heat recovery device. Such a device would heat incoming intake air with outgoing exhaust air in order to maintain a comfortable environment within the VFHCD as described herein. The pocket may also contain an energy recovery device.

The pocket may comprise a sensor that detects one or more harmful or poisonous gases as the gases enter the VFHCDs. The harmful gases may include $CO_2$, CO, $NO_x$, radon, or methanethiol. The pocket may also contain one or more sensors.

The depicted VFHCDs further includes a water reservoir in the pocket. The water reservoir acts as a water source to the neck fabric wherein the water may be wicked by the neck fabric to provide evaporative cooling for the user to provide cooling to the neck area and cool air to breathe.

The VFHCDs described herein may comprise a compartment containing a chilled mass such as ice. Incoming air is cooled as it passes over the ice and into the device. As the ice melts, the water is evaporated as the air passes over which can provide a further mode of cooling.

In some embodiments, a pocket may be located inside the fabric portion or inside the VFHCD.

Air flow in the VFHCD embodiments described herein may be conditioned as follows. Incoming air from the environment is pushed in by one or more fans and passes through a pocket followed by a filter wherein particulates are removed. The air is pulled or pushed in by negative or positive air flow. Exhaust air from the user may then be exhausted through an exhaust filter located in the frame as previously illustrated herein. Air pressure differences may be detected by one or more sensors.

The VFHCDs may further include a fluid atomizer or mister. The atomizer may use water in the water reservoir to provide a mist of water inside a VFHCD. The VFHCDs may further include an environmental control device that can be used by a user to control the temperature inside the device by raising or lowering the temperature. The environmental control device may further comprise a source of water vapor to increase the humidity of the air inside the device.

The VFHCDs described herein may further include a heater. The heater can heat the air inside a VFHCD. The heater may be an electric resistive heater. The VFHCDs may further include a chiller to chill the air inside a VFHCD.

In some embodiments, the fabric components described herein may comprise a phase-change material, such as that deployed in high-end sport clothing. The phase-change material, which may be encapsulated in the fabric of the VFHCD or held in reservoirs elsewhere in the VFHCD, works by reversibly storing and releasing heat at pre-defined temperature ranges. In the most common example, the phase change material is used to retain heat in a device designed to be used in sub-zero environments. The material, such as a paraffin or lipid, melts when in an environment with a temperature above a certain point. This melting is endothermic, so the melting cools the inside of the device. When the device is in a colder environment, the material solidifies, e.g., crystallizes, which is an exothermic process, thus warming the inside of the device.

Another temperature-affecting technology that may be incorporated into the impermeable fabric portion of the VFHCDs is one that is designed to wick perspiration away from the user. As that perspiration evaporates, the user is cooled thereby. One commercial example of such technology is available from Arctic Cool® in their products sold as HydroFreeze™.

In other embodiments, the VFHCD further comprises a compressor to provide heating or cooling to the device. The compressor may be held in a backpack worn by the user. Preferably, the compressor provides heating or cooling directly to the neck area of the user. The compressor may comprise a 24V DC compressor. Alternatively, the compressor heats and/or cools the air as it is brought into the device.

A VFCD described herein may further include a multi-speed air moving system. The multi-speed air moving system may be a dual speed fan. If a pre-set environmental threshold or parameter is exceeded within the VFHCD, such as temperature or humidity, the air moving system increases to a higher speed to improve the environment by increasing air flow within the VFHCD. The air mover may be adjusted continually to maintain a desired target atmosphere in the device.

A VFHCD described herein may include one or more sensors to provide filter end of useful life alerts to the user based on at least one of age of the filter, increased head pressure on the filter and optical readings indicating a dirty filter.

In some embodiments, wearable electronics may be embedded in the neck fabrics, frame, air moving device, or face shield to provide environmental and thermal monitoring within the devices described herein. The wearable electronics may also monitor the temperature, air flow, and air conditions inside the device. The electronics may be powered by the power source used for the air moving device or a separate power source may be used. The electronics may include one or more sensors may be included to detect for air leaks around the fabric portion sealed around the neck area.

Communication Component for a Variable Flow Head Covering Device (VFHCD)

The following embodiments include a communication component or hardware with a VFHCD. This communication hardware is used to provide audio and/or video capabilities for the user in a VFHCD. As such the communication hardware facilitates communication with other people who may or may not be wearing an HCD, as well as news, alerts, weather, entertainment, and other services to the user. The communication hardware may also facilitate communication with a smart device such as a smart phone, tablet, or wearable.

A VFHCD described herein may be equipped with communication hardware components, according to an embodiment of the disclosure. The communication hardware components may be connected to the internet. The communication hardware may be wirelessly connected to a smart phone. The communication hardware further comprises Bluetooth technology for wireless communication with the smart phone. The VFHCD may comprise a speaker. The speaker may communicate audio to the user and may be an earphone, headphone, ear bud, or an earpiece. A speaker allows a user to better hear sounds coming from outside the device or to communicate with another person. The speakers may be used to communicate with someone specifically wearing a similar VFHCD. A speaker may be mounted on the face shield or frame near one ear. A VFHCD may further comprise a second speaker. The second speaker may also be mounted on the face shield or frame near the other ear. One speaker may be mounted on a rigid portion inside of the VFHCD and a speaker mounted on a rigid portion outside of the VFHCD. The speakers may be wired or use wireless technology such as Bluetooth™. The speakers may be connected to a device containing a library of music such as an mp3 player or smartphone.

A VFHCD may further comprise a microphone. The microphone can be used to capture audio signals outside the device. The microphone can be mounted on the face shield and could be wired or use wireless technology. One microphone may be mounted on a rigid portion inside of the VFHCD and a speaker, that is in communication with the microphone, mounted on a rigid portion outside of the VFHCD. This allows for easy and clear communication to others of the outside world by facilitating the user's voice being heard outside the device. The microphone may be a voice activated microphone. A VFHCD may be equipped with Bluetooth® technology to allow for making and receiving phone calls or streaming to a device for music, video, etc. such as with a smart phone or wearable smart device. Device to device audio connections could be privately paired, or public according to signal strength. This way, other users nearby will only be heard according to distance, like normal audio. The VFHCD may further comprise a speaker with an amplifier to amplify outside sounds or amplify the voice of the user to others outside. The VFHCD may further comprise a cellphone system utilizing speakers and a microphone. The communication hardware may comprise speakers to provide audio signals to the user and a microphone to capture sounds outside the device and an audio signal processor configured to process input from the microphone and provide noise-cancelling audio signals to the user through the speakers.

In some embodiments, a passive, non-electronic device may be used to enhance the hearing of a user of a VFHCD. For example, an "ear-outside-ear" type device may be used. An ear trumpet-like device may be used that is located near where the ears of the user would be located in a VFHCD and would penetrate and pass through the face shield or frame but would further comprise a membrane or diaphragm to add in transmitting sound but also prevent unfiltered air from entering or leaving the device.

A VFHCD may further comprise a universal serial bus (USB) port, of any type, or any other type of data and/or charging port.

A VFHCD described herein may further comprise a video display such as a liquid crystal display (LCD), a light emitting diode (LED) display or an electrophoretic reflective display. Alternatively, the display may be formed by images projected onto a surface, such as the inside surface of the face shield. The display may be mounted on the other inner or outer surface of the face shield such that the display is not in the direct view of the user. The video display provides images for augmented reality, way-finding, Global Positioning System (GPS), maps, or environmental warnings.

The displays may be in the form of an optical head-mounted display (OHMD) that is mounted on the face shield. The OHMD may be "smart glasses" such as Google Glass or Apple Glass. An HCD described herein may comprise a holographic projection system to project a display onto the inner surface of the face shield. Any of the communication hardware devices described herein may be powered by a power source such as a battery pack mounted on a VFHCD or in the frame of a VFHCD. A solar cell can be used to charge the power source.

In some embodiments, the video displays may be used for gaming applications. A VFHCD may be integrated with a gaming console for a user to play E sports, adventure, or other games while wearing the device.

In some embodiments, a VFHCD may comprise a night vision device. The device may be slid down over the eyes and may be located inside or outside of the face shield. In some instances, the night vision device may be a stationary device mounted to the frame or face shield. In this instance, the VFHCD may only be used for night vision purposes.

A VFHCD may further comprise an antenna. The antenna may be used to pick up radio and other frequencies. The antenna may be sewed into the fabric component, coated onto the face shield, or inside the frame, or incorporated into the device in any manner. The antenna may be used to communicate with other users of an VFHCD.

A VFHCD described herein may comprise one or more lights in the VFHCD. The lights may be LEDs and are to provide a lighted atmosphere for the user. This is particularly useful in dimly lit conditions inside or at night. In a preferred embodiment, the one or more lights are situated inside and at the top of the VFHCD though the lights may be located throughout the device. The lights may be configured to direct light rays in front of the face of the user. The lights may also be needed to indicate the presence of a user. One or more lights may be located on an outer surface of the device. This would be beneficial if using the device at night and act as a headlight for other to be able to see the user. The internal lights may be helpful for someone to view the face of the user in dimly lit environments.

A VFHCD described herein may further include a multi-speed air moving system. The multi-speed air moving system may be a dual speed fan. If a pre-set environmental threshold is exceeded within the VFHCD, such as temperature or humidity, the air moving system increases to a higher speed to improve the environment by increasing air flow within the device.

In some embodiments, a VFHCD comprises an audible alert to provide warnings to the user.

In some embodiments, a VFHCD further comprises an external electronically switchable display to display text or images to people who approach the user. This may be for users who are deaf.

Automatic Air Mover for a Variable Flow Head Covering Device (VFHCD)

The following embodiments relate to air movers that automatically start when a user places a VFHCD over their head. The air mover automatically turns off when the user removes the VFHCD. The air mover may also adjust according to a pre-determined threshold.

A VFHCD described herein may comprise a spring-loaded lever switch. The lever switch may be located at the top of the VFHCD near a head resting pad or head harness. The lever switch comprises a lever and a resilient device. In an exemplary embodiment, the lever may be a part of resting pad or harness. The lever may protrude out of the resting pad or harness such that when it is depressed, it retracts into the resting pad or harness such that when a user places the device on, the user cannot feel the lever. The user instead feels the resting pad or harness to provide a comfortable experience.

When a VFHCD is placed on the head of a user, the lever is depressed and pushed into the resting pad or harness (such as in a cavity) or other location so that it is not uncomfortable to a user. By depressing the lever, the pressure switch completes an electrical circuit such that power from a battery pack comprising one or more batteries or other power source provides an electrical current to an air moving device, such as a fan. The air mover then automatically turns on. When a user removes the device from their head, the lever is extended by the spring which breaks the electrical circuit between the air mover and power source which automatically shuts down the air mover.

A VFHCD may comprise one or more sensors. The sensor can detect the head of a user and sends a signal to turn on the air mover. The sensor may be a temperature sensor, pulse rate sensor, IR sensor, optical sensor, humidity sensor, proximity sensor, motion sensor, skin moisture sensor, force sensor, or a biometric sensor. Upon detection of the head of the user placing the device on, the automatic air mover turns on. This may be done by measuring the temperature of a user or a proximity sensor of a nearby object, such as the head of a user. When the device is removed, the sensor no longer detects the head of a user and the air mover then turns off. The sensor may be located anywhere within a VFHCD, such as on the face shield or in the frame.

The sensor may detect a change in the biometric data of a user which may be relayed to a controller. The controller would then adjust the air flow from an air mover until a pre-determined biometric data target is reached. The biometric data may include skin temperature, pulse rate, skin moisture, or oxygen saturation. A processor may also be combined to process the signals from the sensors.

A VFHCD may further comprise a controller that is configured to adjust the rate at which the air mover moves air. A sensor detects the air flow. When the air flow falls below a pre-determined threshold of air flow, the sensor relays the information to a controller that adjusts the rate of air flow from an air mover. The air mover increases the air flow until the threshold is reached. In some instances, the air flow may rise above a pre-determined threshold such that the controller decreases the air flow. The VFHCD may further comprise a sensor for generating signals indicative of at least one of air pressure, ambient temperature, body temperature, skin moisture, blood oxygen saturation, respiration rate and pulse rate, and a processor for processing signals from the sensor and providing instructions to the controller to adjust the rate of the air mover according to predetermined parameters.

A VFHCD may further comprise a communication module for receiving signals relating to at least one of air pressure, ambient temperature, body temperature, skin moisture, blood oxygen saturation, respiration rate and pulse rate, and a processor for processing signals from the communication module and providing instructions to the controller to adjust the rate of the air mover according to predetermined parameters. The communication module is configured to receive signals from the user's smart device. The device is configured to communicate with an app running on a user's smart device, which app is configured to provide alerts to the user and to allow the user to adjust the rate of the air mover. The communication module is configured to receive signals from the user's wearable smart device.

A VFHCD may comprise a microphone inside the device, wherein a respiration rate of the user is detected acoustically, and wherein the speed of the fan may be adjusted to accommodate different respiration rates of the user.

A VFHCD may further comprise a sensor for generating signals indicative of the concentration of oxygen, and a processor for processing signals from the sensor and providing instructions to the controller to increase the rate of the air mover when the oxygen concentration of oxygen falls below a predetermined level. The device further comprises a user warning system, configured to alert the user when the concentration of oxygen falls below the predetermined level.

A VFHCD may further comprise a sensor for generating signals indicative of the concentration of carbon dioxide, and a processor for processing signals from the sensor and providing instructions to the controller to increase the rate of the air mover when the concentration of carbon dioxide rises above a predetermined level. The device further comprises a user warning system, configured to alert the user when the concentration of carbon dioxide rises above the predetermined level. The device further comprises a second sensor for generating signals indicative of the concentration of oxygen, and wherein the processor processes signals from the sensor and the second sensor and provides instructions to increase the rate of the air mover when either the concentration of carbon dioxide rises above a predetermined level or the concentration of oxygen falls below a second predetermined level.

A second sensor may be located on the VFHCD to detect air pressure outside the device. The speed of the air mover may automatically be adjusted in response to the signals from the first and second sensors to maintain the air pressure inside the device within a predetermined range.

A VFHCD described herein may further comprise two or more electrodes. The electrodes may be located in the fabric component, in the resting pad or harness, earpieces, or elsewhere in the device where the skin of the user comes into contact with the electrodes. By coming into contact with the electrodes, the circuit is closed and a current is able to pass. This current is detected by a sensor that initiates the starting of the air mover.

In some embodiments, the air moving device may be combined with a head covering device that comprises a flip-up shield. The flip-up shield may be connected by a hinge to the frame. The air moving device may shut off when the shield is flipped open by the user. The air mover may turn on when the shield is closed.

Shroud for a Variable Flow Head Covering Device (VFHCD)

The following embodiments include a shroud-like component that can at least partially cover the transparent face shield in a VFHCD when a user desires to have a darkened environment to relax, sleep, or for enhanced privacy. In some embodiments, the shroud completely covers the transparent face shield, while in others, the shroud only partially covers the transparent face shield, so as to provide privacy, while allowing some light inside the device.

A VFHCD described herein may be equipped with a shroud, according to an embodiment of the disclosure. A user wearing a VFHCD may further comprise a shroud that is placed or slipped over the HCD. The shroud may comprise a flexible, stretchable, or stiff fabric and may also be referred to as a cover, blackout cover, sleep cover, or privacy cover. In preferred embodiments, the shroud is opaque. The shroud may comprise a polymeric material such as nylon, rayon, spandex, lycra, viscose, or a natural fabric such as cotton or wool. Preferably, the shroud comprises a sealing device to seal shut the shroud when placed over a VFHCD. The sealing device may be a zipper abut may also be hook and loop fastener, a drawstring, laces, or other device. In some embodiments, the shroud may be stretched and fit snuggly over the VFHCD such as how a sock fits over a foot. In a preferred embodiment, the shroud has a much higher porosity and higher permeability than the fabric component in a VFHCD to allow for unrestricted air low. The shroud may have twice as high air permeability than the fabric component. The shroud may be constructed entirely of mesh except the portion that covers the face shield. The shroud may partially or completely cover the face shield in a VFHCD. The shroud may partially cover the transparent face shield so as to provide privacy, while allowing some light inside the device.

The shroud may further comprise an opening so that the head of a user or a user wearing a VFHCD can pass. The opening may comprise a flap that can be closed when the user is not using the VFHCD. In a preferred embodiment, the flap may be held shut using hook and loop fastener pads but may also be a zipper, clasps, laces, or buttons.

The shroud may further comprise one or more openings for intake or exhaust air. The openings allow air to pass through to and away from the shroud, through the VFHCD and to the user wearing a VFHCD. The air openings preferably are a mesh material that minimally restricts air flow. The openings allow unrestricted air flow by one or more air moving devices in a VFHCD while a user safely relaxes or sleeps.

The shroud may further comprise one or more optional handles. The handles are to provide a way for a user to carry the device when stored or toted in the shroud. The shroud further protects the face shield 106 from getting scratched or damaged. The shroud can serve as a protective cover for the device when not in use.

Washable Fabric for a Variable Flow Head Covering Device (VFHCD)

The fabric component of a VFHCD described herein may be removable, washable, the materials of construction can be modified, and the appearance is customizable by a user. The fabric component of a VFHCD can be removed after use, washed of any particulates removed during operation and reused. The fabric may comprise a thread count of about 100-1000. The length of the longitudinal axis of the transparent face shield is about twice as large as the diameter of the head opening in the fabric component.

The appearance of the fabric component may also be customizable by a user. The fabric component may comprise a unique design. The design may be any other pattern such as stripes or other geometric patterns. The fabric may comprise the colors or logos of a college, high school, or professional sports team. The fabric may comprise the colors or flag of a country or state.

The fabric component may comprise an absorbent material. The absorbent material can soak up a liquid spill. The absorbent material may comprise linen, cotton, modal fabric, rayon, wool, French terry toweling fabric, fleece, bamboo fabric, sponge, microfiber, hydrogel, plush fabric, hemp, or flannel.

The fabric component may comprise a port for access to the mouth or nose area of a user. The port may be a diaphragm. The port can allow a straw to pass through while maintaining a seal to prevent air leakage.

The fabric component may comprise a stretchable backing. The stretchable backing acts as an expandable opening for ease of opening and ease of placement over the head of a user. The stretchable backing is expandable while the rest of the fabric may be stiff and non-stretchable. The stretchable backing may comprise a stretchable silicone material. The silicone backing material may comprise a spring steel strip to provide tension to secure the VFHCD in place on the head of a user.

Electromagnetic Radiation (EMR) Filtering Face Shield for a Variable Flow Head Covering Device (VFHCD)

Designs and methods to filter electromagnetic radiation hitting the face shield from a user wearing a VFHCD are described herein. A VFHCD described herein may be combined with an electromagnetic radiation filtering face shield. The face shield may comprises a layer that completely or partially covers the face shield that can be tuned to selectively filter one or more wavelengths or wavelength ranges of EMR, such as ultra-violet (UV), visible, or infrared (IR) radiation. In a preferred embodiment, the face shield may filter UV light only. In some embodiments, particularly those used for healthcare environments, or for travel, the transparent face shield may be transparent to infrared (IR) radiation to allow for determination of the temperature of a user.

The face shield may comprise a photochromic layer. The photochromic layer may reversibly darken in the presence of UV radiation, such as from sunlight. The photochromic layer may reversibly darken in the presence of UV-A light (wavelengths of 320-400 nm). The photochromic layer may reversibly darken in the presence of both UVA and UVB light. The photochromic layer may comprise an inorganic material such as AgCl. The photochromic layer may comprise an organic material such as an oxazine or a naphthopyran-based material. The photochromic layer may comprise the material used in Transitions® lenses.

The face shield may comprise a polarizing filter layer. The polarizing layer may be a linear polarizer or circular polarizer. The polarizing layer may be tuned to filter visible, UV, IR, radio waves, microwaves, or X-rays.

The face shield may comprise an electrochromic layer. The electrochromic layer comprises an inorganic material such as $WO_3$. The electrochromic layer may comprise an organic material such as a conducting polymer or a viologen-based material. The conducting polymer may be a polyaniline, polythiophene, poly(3,4-ethylenedioxythiophene) (PEDOT), or a polypyrrole-based polymer, or combinations thereof.

A VFHCD described herein may be combined with a patternable electromagnetic radiation filtering face shield.

The face shield may comprise a layer that partially covers the face shield to filter one or more wavelengths or wavelength ranges of EMR, such as UV, visible, or IR radiation. The face shield may comprise a patternable EMR filtering layer such as a patternable photochromic layer, electrochromic layer, or polarizing layer.

An EMR filtration layer may be located on the top half of the face shield in a VFHCD. The EMR layer acts as a sunshade wherein a user may not need to wear a pair of sunglasses behind the face shield. Additionally, the partial EMR filtration layer can help to keep the user cool by reflecting EMR radiation from the top of the head and eyes of a user. Only blocking a portion of the light that passes through the face shield allows a VFHCD to be used indoors.

In some embodiments, a moveable visor may be used instead of a permanent EMR filtering layer on the face shield. Such a visor can be mounted either on the inside or on the outside of the face shield. In either event, the moveable visor may be slid across the face shield. The visor is moveable and can be moved to overlap at least a portion or all of the face shield. The moveable visor may be opaque to all EMR. The moveable visor may be tuned to be opaque to only select wavelengths or ranges of wavelengths such as UV, visible, IR, X-rays, or microwaves. At least a portion of the transparent face shield is opaque to ultra-violet (UV) radiation. The moveable visor may be part of the frame wherein the visor may be slid up and down or side to side over the face shield. In other embodiments a detachable visor may be used to block specific wavelengths of light. The detachable visor may be attached and unattached with a device such as hook and loop fastener, buttons, clips, screws, or other mechanism. The visor may be on the inside or outside of the face shield.

Safety Features for a Variable Flow Head Covering Device (VFHCD)

A VFHCD may be combined with safety features to protect a user from harm where the risk of injury is high. A VFHCD may be integrated with an impact resistant top portion. In some instances, a user may not only desire or require a controlled atmosphere or breathing environment provided by a VFHCD, but also further safety if the user is working in a setting where there may be hazards, such as occupational hazards. For example, the setting may be a construction site, manufacturing plant, mining site, oil rig, or a natural disaster zone. The impact resistant top portion is also referred to as a hard hat to protect the head from injury due to falling objects, impact with other objects, debris, rain, and electric shock. Suspension bands inside the helmet spread the helmet's weight and the force of any impact over the top of the head.

A VFHCD described herein may be further integrated with a hard hat. A VFHCD and hard hat may be joined together in such a way so that the hard hat stays in place on top of the device and does not come off. A locking mechanism may be used to secure the device and hard hat together into a single rigid structure such as snaps, screws, straps, or other mechanism. The locking mechanism may be manipulated to convert the single rigid structure back into separate portions. In other embodiments, the VFHCD and hard hat may be of unitary construction where the frame and hard hat are one piece and only the fabric, filters, or fan may be removed to be able to be cleaned or replaced. The hard hat may comprise a polymer or metal.

The hard hat may be a Type I hard hat that is intended to reduce the force of impact resulting from a blow only to the top of the head. The hard hat may be a Type II hard hat that is intended to reduce the force of lateral impact resulting from a blow which may be received off-center, from the side, or to the top of the head. The hard hat may be a Class E electrical hard hat that is designed to reduce exposure to high voltage conductors and offer dielectric protection up to 20,000 volts (phase to ground). The hard hat may be a Class G general hard hat that is designed to reduce exposure to low voltage conductors and offer dielectric protection up to 2,200 volts (phase to ground). The hard hat may be a Class C hard hat. Class C conductive hard hats differ from Class E and G hard hats in that they are not intended to provide protection against contact with electrical conductors. Class C hard hats may include vented options which not only protect the wearer from impact, but also provide increased breathability through their conductive material (such as aluminum) or added ventilation.

In some embodiments, the hard hat or VFHCD may further comprise one or more optional sensors. The sensors can be located around the perimeter of the hard hat or at various locations in the frame of a VFHCD. A VFHCD or hard hat may further comprise compartments where the sensor electronics are located. In some embodiments, the sensor electronics may be located inside the hard hat or inside the frame of the VFHCD.

Various types of sensors may be used. One or more sensors can be configured to detect either an environmental condition or a condition of the user. A processor may be configured to receive signals from the one or more sensors and execute a protective measure.

Various types of sensors may be used. One or more proximity sensors may be installed in the VFHCD/hard hat embodiment. The proximity sensors can warn a user if the user is coming into close proximity to a stationary object, or a large moveable object is approaching such as a forklift or autonomous robot and detect a possible collision. The sensors may also be used to provide a warning or signal to the person operating the heavy machinery or other large object to halt or divert their movement. The proximity sensors may also detect if a user is approaching a particularly dangerous location and other scenarios. The sensors would alert the user to the danger. Different types of audible signals or visual messages may be relayed to the user depending on the type of danger present. The sensors may also be able to wirelessly relay the location information in real-time to a central database to be tracked, monitored, and recorded, such as by a site manager. If an incident does occur, the incident can be automatically tracked and recorded and relayed to and warn other users in the industrial setting of any dangers.

A VFHCD or hard hat may comprise a unique QR code. The QR code may be scanned by a scanner or cell phone which is relayed to a monitoring system that a user is entering the industrial setting. Each user may be assigned a unique QR code. Once a user places a VFHCD and hard hat on, the movements of the user can be tracked and warned of any impending danger. The VFHCD or hard hat may comprise a GPS device to track the movements of the user. The device may also be used to communicate with other users so that user can send to or receive alerts from other users.

In the event a user is at risk of being hit with an object, the proximity sensor may detect the object and an inflatable personal airbag may be deployed from the VFHCD or hard hat to minimize any danger to the head and neck area of the user.

The face shield may further comprise a layer of a polarizing film or an electrochromic layer, or a combination thereof, on the inner or outer surface of the face shield to filter EMR. One or more sensors may be configured to detect harmful light rays and the protective measure to block the harmful light rights from harming the user's eyes. In an exemplary embodiment, the EMR filtering layer can filter light with a wavelength range of about 200-380 nm. The film may sufficiently filter UV and infrared light so that a VFHCD can be safely used by welders in fusion and pressure welding processes. The film or shield may further comprise a protective layer to protect against flash burn or sparks that may occur during welding. In an exemplary embodiment, the face shield with the EMR filtering layer is American National Standards Institute (ANSI) Z87.1+ certified and compliant. The entire face shield or a portion of the face shield may be covered by an EMR film.

For further protection for welders, the filters in the VFHCD may be capable of filtering welding fumes or other toxic fumes or atmosphere. Welding fumes typically consists of visible smoke that contains harmful metal fume and gas byproducts. Welding fumes can contain a variety of metals, including aluminum, arsenic, beryllium, lead, and manganese. Argon, nitrogen, carbon dioxide, carbon monoxide, and hydrogen fluoride gases often are produced during welding. Sensors may be combined with a VFHCD described herein to specifically detect welding byproducts. The sensors would preferably be placed inside the VFHCD near an inlet filter to detect any welding fume ingress. The sensors could give a visual or audible warning to the user. The sensors may also seal the VFHCD and provide stored safe air to the user from a canister located on the VFHCD or elsewhere on the user such as an air tank.

In some embodiments, the fabric component in a VFHCD comprises a flame-retardant or flame-resistant textile. The fabric may be of the Marlan class of fabrics such as Marlan AL600 aluminized fabric, Marlan HV, or Marlan SX. The fabric may comprise aramid (e.g., Nomex), polybenzimidazole, melamine, coated nylon, flame-retardant cotton, carbon foam, or modacrylic.

One or more sensors may notify the user of harmful levels of noise. The earpieces in a VFHCD may be modified or enhanced to limit the amount of occupational noise the user is exposed to in loud industrial environments and to protect the hearing ability of the user. For example, the earpieces may be able to prevent the user from being exposed to noise greater than 85 decibels. The VFHCD may comprise optional secondary electronic noise reduction devices. The secondary electronic noise reduction devices are in electrical communication with a power source by one or more wires. The electronic noise reduction devices may comprise optional noise or wave cancelling earpieces adjacent to the ear canals to reduce occupational noise. A barrier may be moved over the ears of the user to block harmful sound and noise to prevent ear damage.

In some embodiments, one or more sensors are configured to detect a condition of the user selected from the group consisting of pulse rate, respiratory rate, body temperature, head orientation, closed eyes, and combinations thereof. If a condition reaches a harmful pre-determined level or conditions, an audible or visual alert may be sent to the user. Furthermore, an alert may be sent to or received from a coworker that is having a medical issue or event.

In some embodiments, a VFHCD may comprise lights for a user to see in dimly lit locations, such as in a mine or at night. The lights may be able to illuminate in a forward or rearward direction. In some embodiments, the lights may further comprise a camera. The camera may face the front, the rear, or be a front and rear facing camera. The light may be connected to the frame and pass through a slit or hole in the fabric component.

Smart App for Working with a Variable Flow Head Covering Device (VFHCD)

The following embodiments describes a VFHCD wherein electronic functions installed within the device can be controlled and monitored by a smart app on a smart device. The smart app may be compatible with smart devices, such as smart phones, tablets, and wearables. The smart app may also include natural language processing (NLP) capabilities to allow for hands-free device usage, greater accessibility for individuals with disabilities, convenience, and novelty. The smart app may have augmented reality capabilities. The smart app may include predictive analytics for a more personal and engaging experience based on past movements and activities. The smart app may utilize biometric data, GPS, or other sensory hardware to provide information about the user, their environment, and their location. The smart app can be downloaded onto a mobile device such as a wearable, tablet, laptop, or cell phone. The smart app can be downloaded onto a non-mobile device such as a desk top computer.

A VFHCD may further comprise an antenna to receive a wireless signal that is extended from the top of the VFHCD. The extending antenna may be rigid or a flexible whip antenna. In other embodiments, the antenna may be hidden from view within the frame of the VFHCD or under the fabric component. In other embodiments the antenna may be in the form of wires located on the surface of the face shield.

A VFHCD may comprise a controller that may include one or more communication systems, including Bluetooth communication chips, Internet Wi-Fi transceivers, network transceivers, a wireless mesh network device such as Z-Wave network transceiver, or a combination thereof to wirelessly communicate with a smart device. The controller may be mounted in the rigid portion of a VFHCD. The controller may be able to control various components of the VFHCD such as the rate of the air mover, humidity level, temperature, dimming of the face shield using an electrochromic layer, audio visual and communication components such as an image or video display, microphone, or speaker on demand by the user using an app on a smart device. The smart device may be a stand-alone smart device or integrated with the rigid portion of the VFHCD. The one or more communication systems may communicate by a wireless signal with at least one of external remote controllers and a cloud-based network in real-time, intermittent time, or in pre-determined time intervals and lengths of time or a combination thereof.

The one or more communication systems may receive instructions from an external remote controller, generate signals instructing components of a VFHCD to operate and to monitor the status of various components. The communications system may generate a signal informing the external remote controller of the status of at least one device in the VFHCD. In an exemplary embodiment, the remote controller may be a smart device such as a tablet, wearable, or mobile phone controlled by a user.

The smart device may communicate to a plurality of devices within a VFHCD. The smart device may also include a wireless transmitter and wireless transceiver and have a connection to each network device of the one or more devices. The connection may include a wired or wireless interface such as Bluetooth, WIFI, mesh network or similar wireless protocol. The application may be configured to execute on a desktop computer, workstation, tablet, laptop, or other suitable computing device.

A graphical user interface for monitoring and controlling functions of a VFHCD with an app may be used, according to an embodiment of the disclosure. The GUI may be displayed on a mobile phone that displays various information and multiple indicators and control functions. The name of the user may be displayed at the top of the screen along with standard information such as the time, temperature, weather conditions, and battery charge status of the smart device. The user can give the device any name. The app may provide an audible alert or a visual alert for the user on the GUI if the battery level goes below a certain level where a limited amount of usage time is left. Controls for the fan speed may be shown and can be controlled.

The GUI may also monitor and control the temperature and air flow rate inside the device are displayed, activating an electrochromic layer to dim the face shield, control the internal temperature of a VFHCD, turn up the hearing volume for the user to hear others, or turn up the speaking volume for others to better hear the user of a VFHCD. Electromagnetic radiation sensors may be used to determine if an electrochromic layer needs to be activated to limit amount of light entering the face shield and provide shade (i.e., shade function) to the user or by a command from the user.

In some embodiments, the GUI may be able to monitor and control more than one VFHCD described herein. A second VFHCD could be added by a QR code located on the VFHCD or search by the name of the VFHCD. A Bluetooth verification method could be used to create a connection between the mobile phone device and the VFHCD. A QR code located on a VFHCD could also be scanned to link the VFHCD to the mobile phone app.

The GUI may be able to be used for monitoring biometric information in a VFHCD, according to an embodiment of the disclosure. In this example, various biometric data may be displayed such as body temp, pulse rate (beats per minute (BPM)), breathing rate (breaths per minute (BPM)), blink rate (blinks per minute (BPM)), and oxygen saturation levels (% $O_2$) that are collected by various sensors in a VFHCD. Other biometric data may be displayed such as head orientation, closed eyes, and combinations thereof. The app may be able to store and monitor the biometric data for more than one user. The biometric data can be selectively collected on a user if the designated user is confirmed by a fingerprint or retinal scanner. A VFHCD may further comprise a processor for receiving signals from biometric sensors and communicate biometric information to the smart device, and wherein the app is configured to receive and process biometric information and provide reports to the user.

The app may provide alerts for any information collected by a VFHCD such as performance of the VFHCD itself or biometric data collected on the user. The alerts may be programmed and set by the user or may be set based on the age, weight, height, or other information of the user.

The app may provide alerts for information collected by safety sensors in occupational safety applications such as exterior temperature, noise level, or air quality. The app may be configured to control the temperature, air flow, volume inside of the VFHCD based on the ambient noise levels in occupational and non-occupational settings. Air pressure differences may also be monitored by one or more sensors and relayed to the smart device and displayed by the app.

The app may receive signals from one or more sensors to test and/or monitor fitment of the system such as the detection of leaks around the seal of the flexible fabric portion and the neck area of the user. The sensors may be able to detect a gas for use in testing fitment.

In some embodiments, the app may provide audio assistance to users who are blind and cannot read the GUI. The audio assistance would read what is one the GUI to the user. The volume of the audio could be controlled for the hearing impaired. The app may be used to control video images or projections within a VFHCD.

The app may be configured to provide an intercom system with one or more users using a similar VFHCD system.

The app may be configured to provide filter end of useful life alerts to the user based on at least one of age of the filter, increased head pressure on the filter and optical readings indicating a dirty filter.

Active Band for a Variable Flow Head Covering Device (VFHCD)

The following embodiments describes a device to more secure a variable flow head covering device (VFHCD) to the head of a user.

An active band may be installed in a VFHCD described herein, according to an embodiment of the disclosure. An active band is a stretchable elastic band that connects to one side of a VFHCD, goes behind the head of the user inside of the fabric component, and connects to the other side of the VFHCD to better secure the device to the head of a user. The band helps to prevent slippage of the device when used by an active user by applying pressure of the mask to the face of the user. This allows a user to wear the device while playing sports (e.g., skiing, cycling), riding in a convertible vehicle, operating construction equipment, or active manual labor.

One end of the active band with an attaching device may be connected to one side of a VFHCD, while the other end is connected to the other side of the VFHCD. The attaching device near each end of the active band may be a hook and loop fastener (e.g., Velcro) though other attaching devices may also be suitable such as snaps or screws. The receiving portion of hook and loop fastener on a VFHCD may be located on the outward facing surface of the earpiece or head harness. The other end of the earpiece may be affixed to the frame.

The invention has been described with reference to various specific and preferred embodiments and techniques. Nevertheless, it is understood that many variations and modifications may be made while remaining within the spirit and scope of the invention.

What is claimed is:

1. A device for filtering air for a user comprising:
    a frame formed in a generally oval-shaped band, the band encircling the user's head, with an upper portion above the user's head and a lower portion proximate to and spaced apart from the user's chin;
    an intake aperture formed in the frame;
    an intake air filter covering the intake aperture;
    an air mover chamber attached with an air-tight seal to an inside surface of the frame and communicating on one end with the intake air filter and communicating on another end with a filtered air supply inlet inside the device;
    an air mover disposed within the air mover chamber and configured to draw air through the intake air filter and push air out the filtered air supply inlet;
    an exhaust aperture formed in the frame;
    an exhaust air filter covering the exhaust aperture;
    a transparent face shield attached with an air-tight seal to
        a front surface of the frame, the shield providing a space for air between an inside surface of the face shield and the user's face; and
    a fabric component comprising:
        a first portion that is air permeable configured to cover the frame and filters; and a second portion that is air impermeable extending from a back surface of the frame to cover a remaining portion of the user's head and encircle the user's neck.

2. The device of claim 1, further comprising:
a second intake aperture formed in the frame;
a second intake air filter covering the second intake aperture;
a second air mover chamber; and
a second air mover;
wherein the intake aperture and the second intake aperture a formed in the band symmetrically on opposite sides between the top portion and bottom portion.

3. The device of claim 2, further comprising a second exhaust aperture and a second exhaust air filter, wherein the exhaust aperture and the second exhaust aperture are formed in the frame symmetrically on opposite sides of the lower portion.

4. The device of claim 3, further comprising a power control box attached inside the top portion of the frame and a rechargeable battery within the power control box for powering the air mover and the second air mover.

5. The device of claim 1, wherein the transparent face shield is constructed from materials that are approved for impact resistance by the American National Standards Institute (ANSI).

6. The device of claim 1, wherein the air mover moves air so that there is a positive flow of air in the device and the air mover can be reversed so there is a negative flow of air in the device.

7. The device of claim 1, further comprising a power control box attached inside the frame and a rechargeable battery within the power control box for powering the air mover.

8. The device of claim 1, wherein the air mover chamber is attached to the frame by a gasket of resilient material.

9. The device of claim 1, wherein the air mover chamber is integrally formed with the frame.

10. The device of claim 1, wherein the air mover is a fan.

11. The device of claim 10, wherein the fan can be operated at different speeds, as selected by the user.

12. The device of claim 10, wherein the fan is suspended by resilient members to isolate vibration of the fan during operation.

13. The device of claim 10, wherein the fan comprises an outlet and further comprising a duct for directing air from the fan to the filtered air inlet.

14. The device of claim 13, wherein the duct is formed from a resilient material to isolate vibration of the fan during operation.

15. The device of claim 1, wherein the transparent face shield is releasably attached to the front surface of the frame by releasable clamps.

16. The device of claim 15, wherein the air-tight seal between the transparent face shield and the front surface of the frame is provided by a resilient gasket.

17. The device of claim 1, wherein the intake air filter is formed with a resilient gasket around a perimeter, and wherein the resilient gasket comprises a circumferential groove, and wherein the intake air filter is held in place as the groove captures an edge of the frame around the intake aperture.

18. The device of claim 17, wherein the exhaust air filter is formed with a resilient gasket around a perimeter, and wherein the resilient gasket comprises a circumferential groove, and wherein the exhaust air filter is held in place as the groove captures an edge of the frame around the exhaust aperture.

19. The device of claim 1, further comprising a switch mounted to the frame, wherein the switch is covered by the first portion of the fabric component, but operable therethrough.

20. The device of claim 19, wherein the switch is a button, configured to activate different modes of operation depending on the number of times the button is pushed by the user.

21. The device of claim 20, wherein the different modes of operation include different speeds for the air mover.

22. A device for filtering air for a user comprising:
a frame formed in a generally oval-shaped band, the band encircling the user's head, with an upper portion above the user's head and a lower portion proximate to and spaced apart from the user's chin;
a first intake aperture formed in the frame and a first intake air filter covering the first intake aperture;
a second intake aperture formed in the frame and a second intake air filter cover the second intake aperture;
a first air mover chamber attached with an air-tight seal to an inside surface of the frame and communicating on one end with the first intake air filter and communicating on another end with a first filtered air supply inlet inside the device;
a second air mover chamber attached with an air-tight seal to an inside surface of the frame and communicating on one end with the second intake air filter and communicating on another end with a second filtered air supply inlet inside the device;
a first air mover disposed within the first air mover chamber and configured to draw air through the first intake air filter and push air out the first filtered air supply inlet;
a second air mover disposed within the second air mover chamber and configured to draw air through the second intake air filter and push air out the second filtered air supply inlet;
a first exhaust aperture formed in the frame and a first exhaust air filter covering the first exhaust aperture;
a second exhaust aperture formed in the frame and a second exhaust air filter covering the second exhaust aperture:
a transparent face shield attached with an air-tight seal to a front surface of the frame, the shield providing a space for air between an inside surface of the face shield and the user's face; and
a fabric component comprising:
a first portion that is air permeable configured to cover the frame and filters; and
a second portion that is air impermeable extending from a back surface of the frame to cover a remaining portion of the user's head and encircle the user's neck.

* * * * *